(12) United States Patent
Faulkner

(10) Patent No.: US 6,389,427 B1
(45) Date of Patent: May 14, 2002

(54) FILE SYSTEM PERFORMANCE ENHANCEMENT

(75) Inventor: Michael R. Faulkner, Bethel Park, PA (US)

(73) Assignee: Redleaf Group, Inc., Pittsburgh, PA (US)

( * ) Notice: Subject to any disclaimer, the term of this patent is extended or adjusted under 35 U.S.C. 154(b) by 0 days.

(21) Appl. No.: 09/322,194

(22) Filed: May 28, 1999

Related U.S. Application Data

(60) Provisional application No. 60/075,929, filed on Feb. 20, 1998.

(51) Int. Cl.[7] .............................. G06F 17/00; G06F 7/00
(52) U.S. Cl. .................................................... 707/104.1
(58) Field of Search ............................... 707/1, 2, 102, 707/200, 201, 100–103 R, 104.1, 203, 205, 530

(56) References Cited

U.S. PATENT DOCUMENTS

| | | | | |
|---|---|---|---|---|
| 4,993,030 A | * | 2/1991 | Frakauer et al. ............ 371/40.1 |
| 5,047,918 A | * | 9/1991 | Schwartz et al. ............ 364/200 |
| 5,313,646 A | * | 5/1994 | Hendricks et al. .......... 395/600 |
| 5,355,497 A | * | 10/1994 | Cohen-Levy ............... 395/700 |
| 5,463,772 A | * | 10/1995 | Thompson et al. ......... 395/600 |
| 5,504,863 A | * | 4/1996 | Youshida ............... 395/184.01 |
| 5,504,892 A | * | 4/1996 | Atsatt et al. ................. 395/600 |
| 5,544,360 A | * | 8/1996 | Lewak et al. ................ 395/600 |
| 5,553,285 A | * | 9/1996 | Krakauer et al. ............ 395/600 |
| 5,561,799 A | * | 10/1996 | Khalidi et al. .............. 395/600 |
| 5,568,639 A | * | 10/1996 | Wilcox et al. .............. 395/600 |
| 5,680,559 A | * | 10/1997 | Chew et al. ................. 395/335 |
| 5,897,638 A | * | 4/1999 | Lasser et al. ................ 707/102 |
| 5,974,424 A | * | 10/1999 | Schmuck et al. ........... 707/201 |
| 5,991,753 A | * | 11/1999 | Wilde ............................. 707/2 |
| 6,055,527 A | * | 4/2000 | Badger et al. .................. 707/2 |
| 6,061,695 A | * | 5/2000 | Slivka et al. ................ 707/513 |
| 6,067,541 A | * | 5/2000 | Raju et al. ...................... 707/3 |
| 6,148,294 A | * | 11/2000 | Beyda et al. .................... 707/1 |
| 6,185,574 B1 | * | 2/2001 | Howard et al. ............. 707/200 |
| 6,189,019 B1 | * | 2/2001 | Blumer et al. .............. 707/513 |

\* cited by examiner

*Primary Examiner*—John Breene
*Assistant Examiner*—Linh M Pham
(74) *Attorney, Agent, or Firm*—Fish & Richardson P.C.

(57) ABSTRACT

Methods and apparatus that enhance the performance of computer file systems, and in particular the performance of read-only operations in such file systems. The invention can be implemented in a suite of computer program modules that together make up a performance enhancement product. The invention can transparently exist in an operating system after an initial setup is completed. The initial setup involves identifying what directories or files are to be monitored in order to intercept access requests for those files and to respond to those requests with enhanced performance. A system administrator can specify what directories or files are to be monitored. A high-performance index of monitored directories or files is maintained. When a monitored file is opened, a file identifier used, thereby bypassing the access of any directory meta data information. In one embodiment, access to monitored files is enhanced by pinning files in the data cache maintained by the file system cache manager.

47 Claims, 13 Drawing Sheets

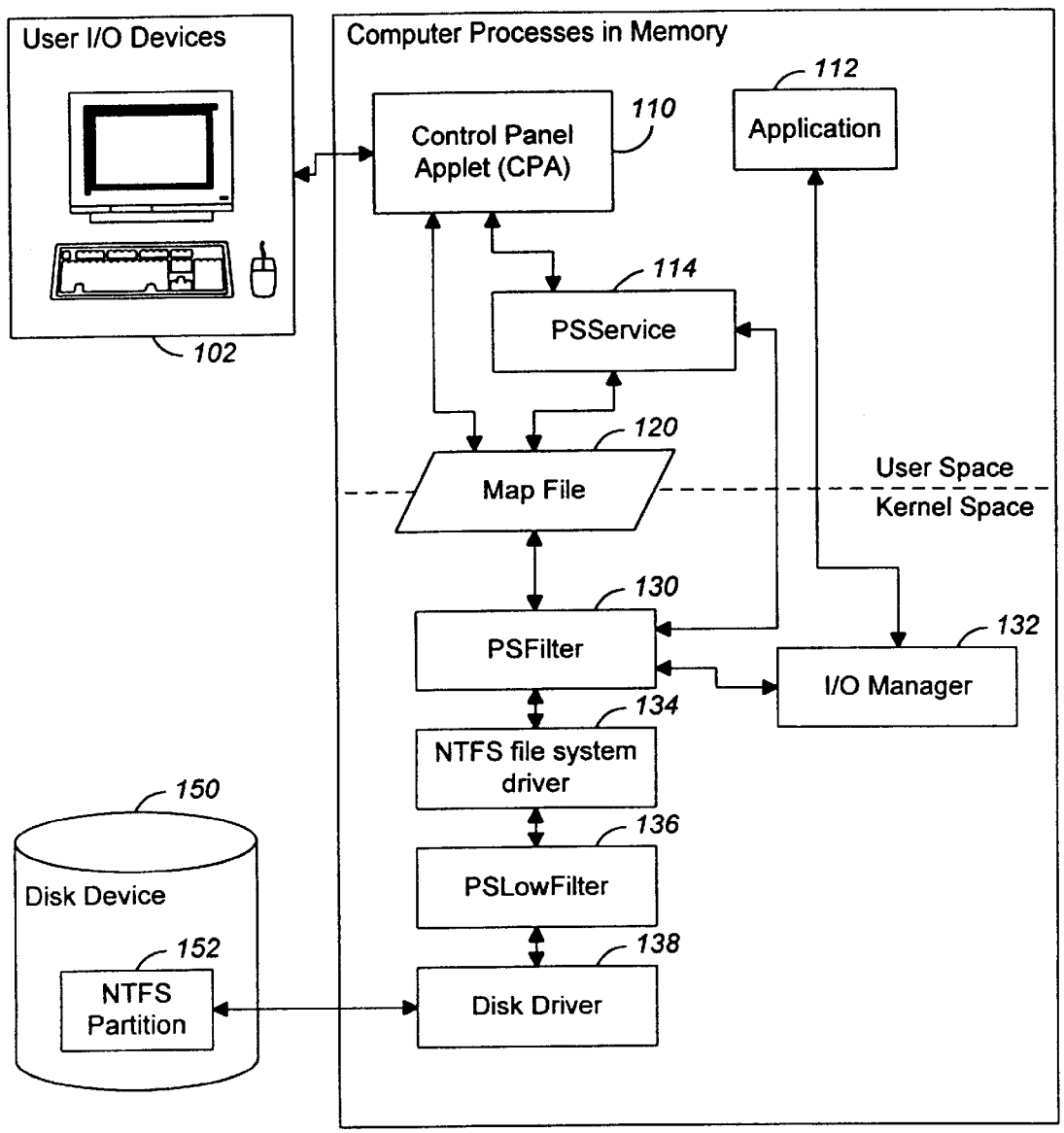
FIG._1

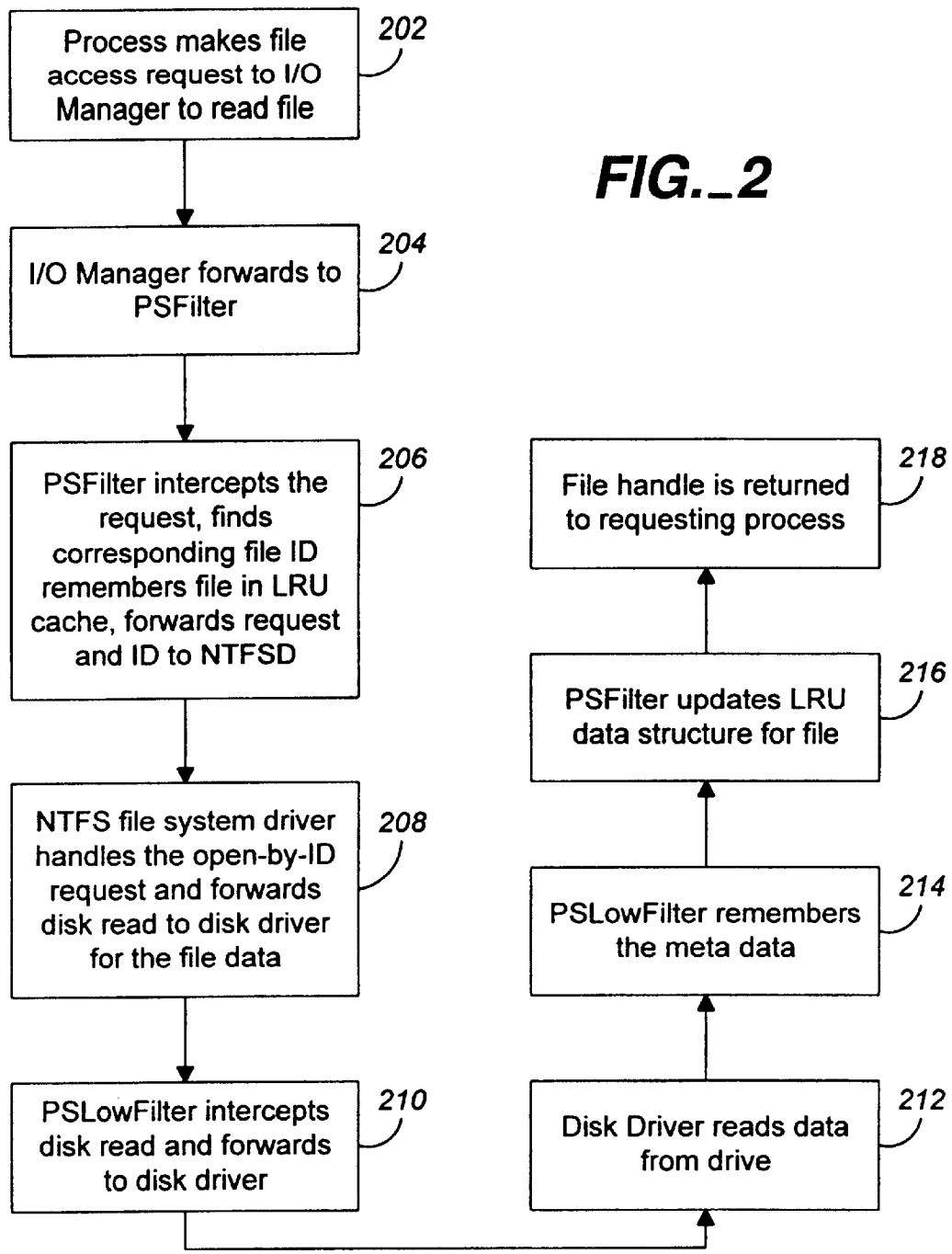
FIG._2

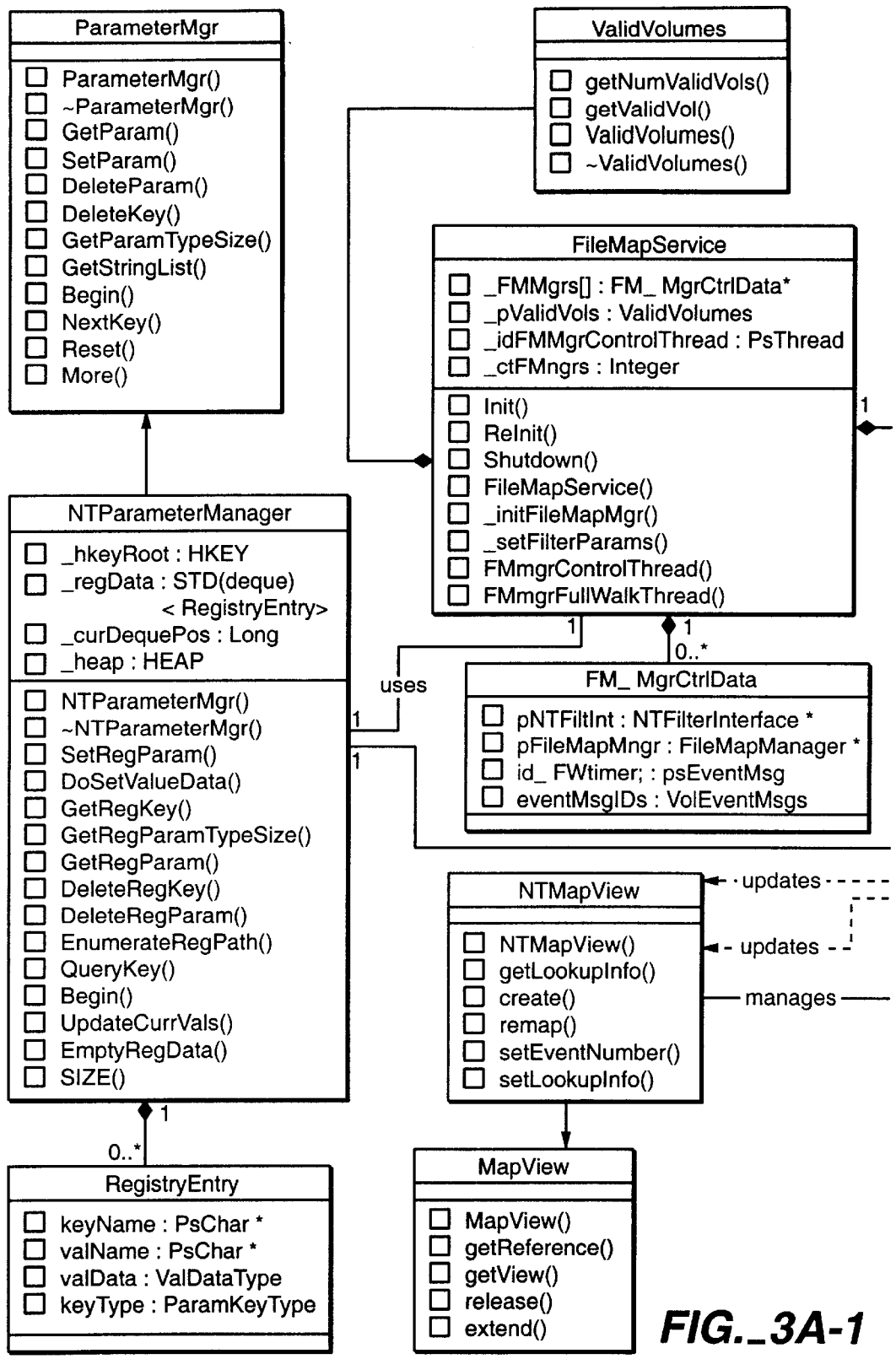
FIG._3A-1

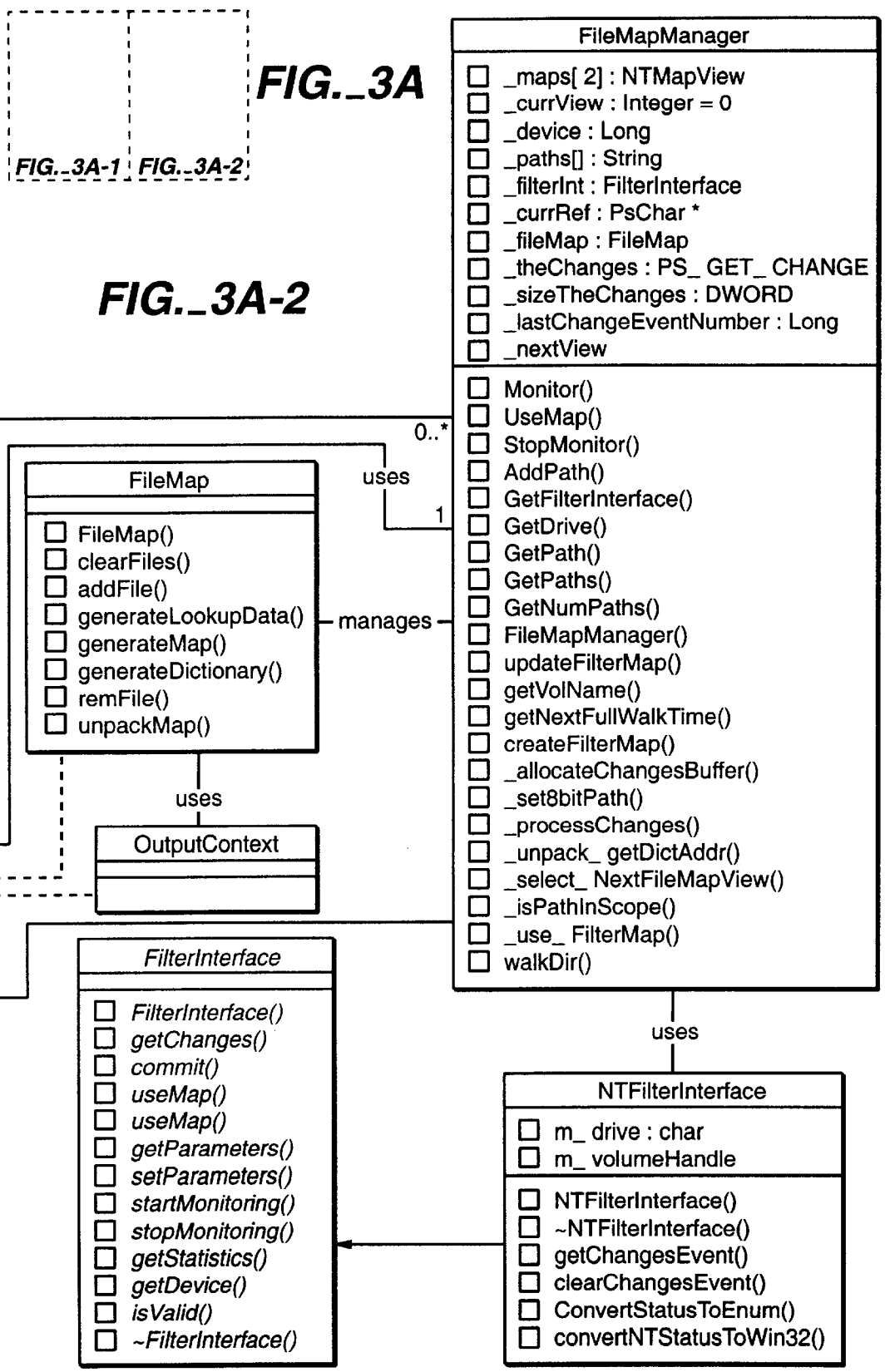

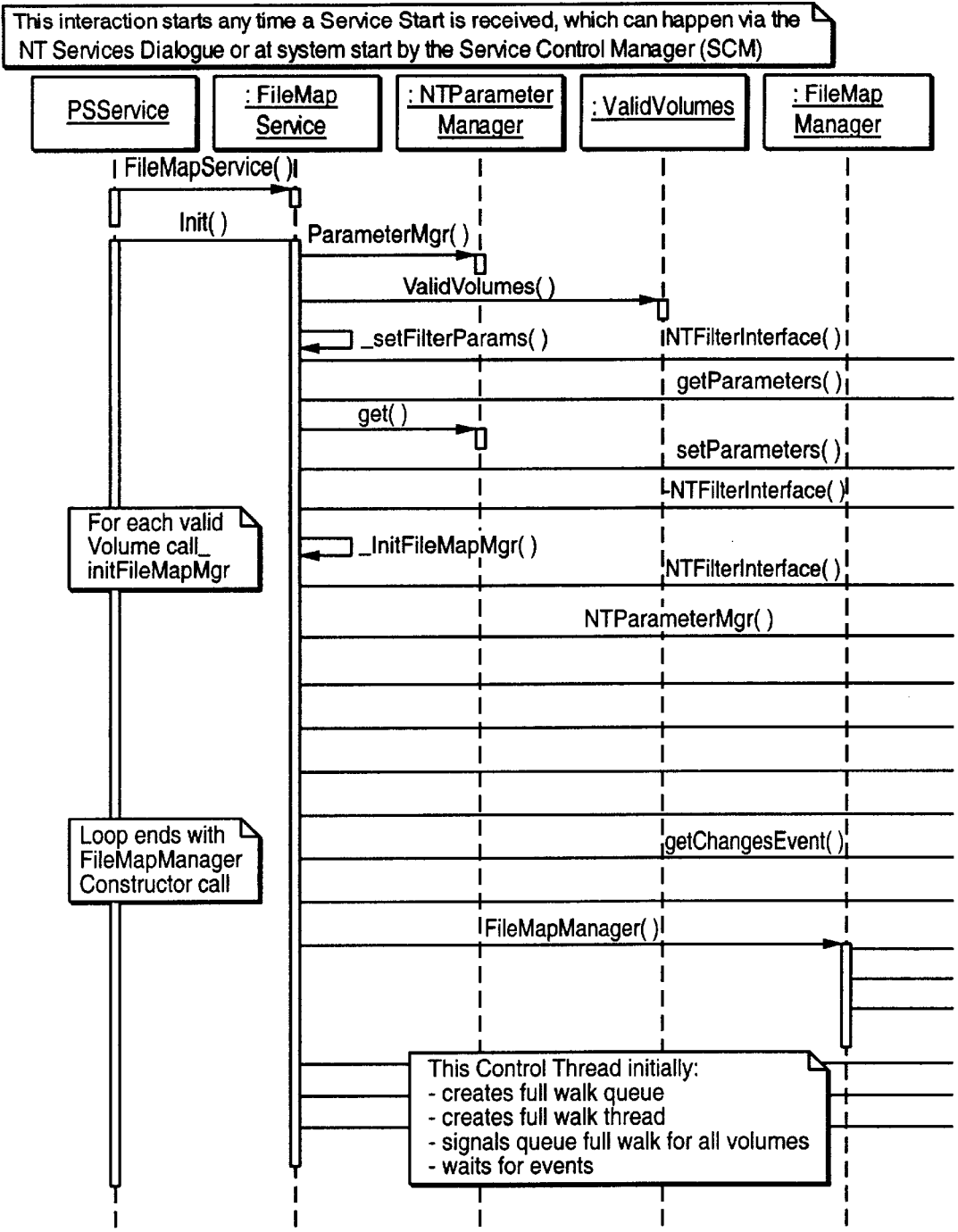
FIG._3B-1

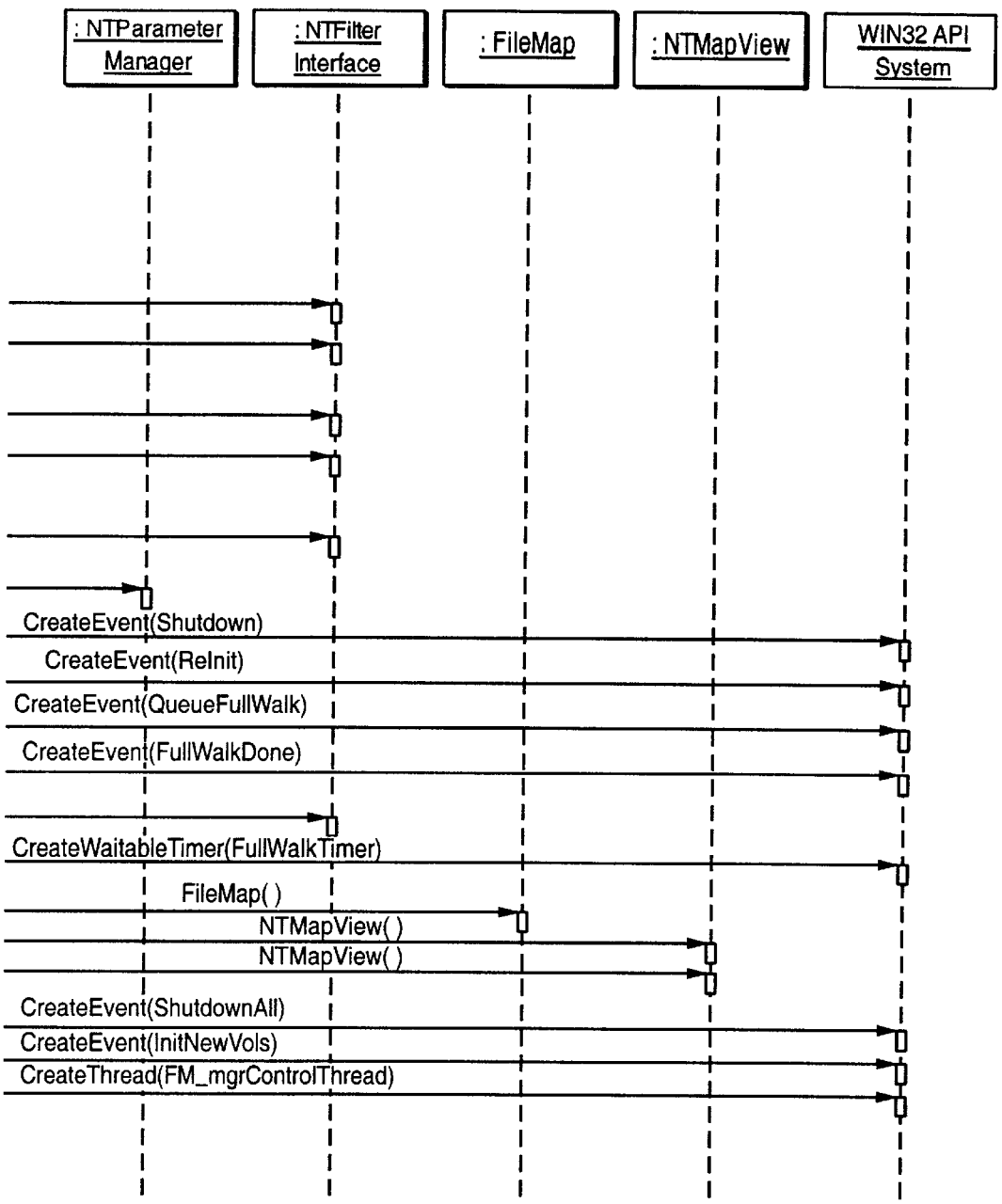
FIG._3B-2
FIG._3B  FIG._3B-1 FIG._3B-2

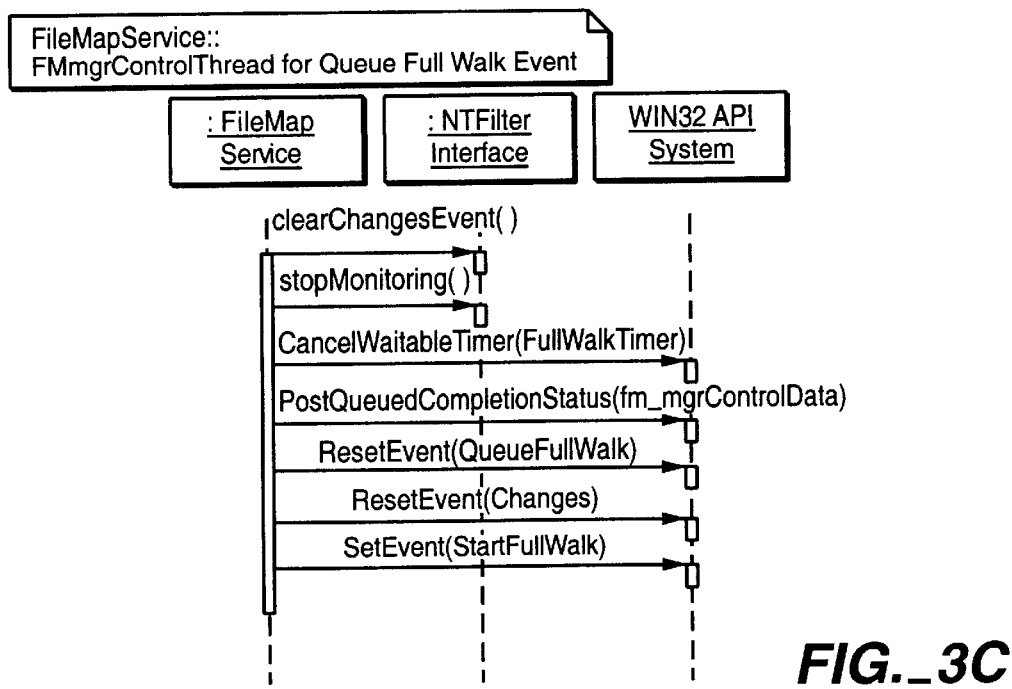
FIG._3C
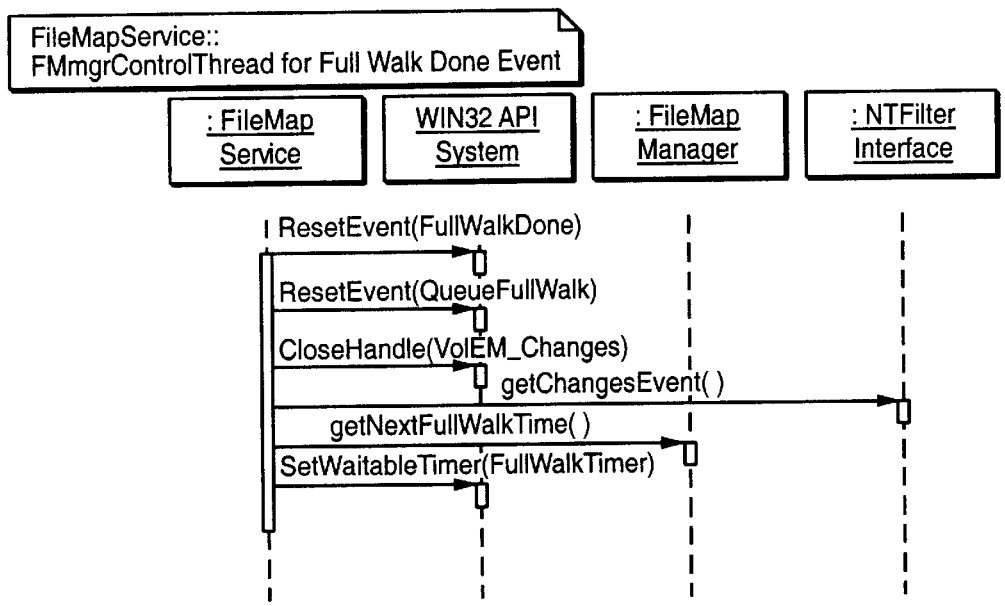
FIG._3E

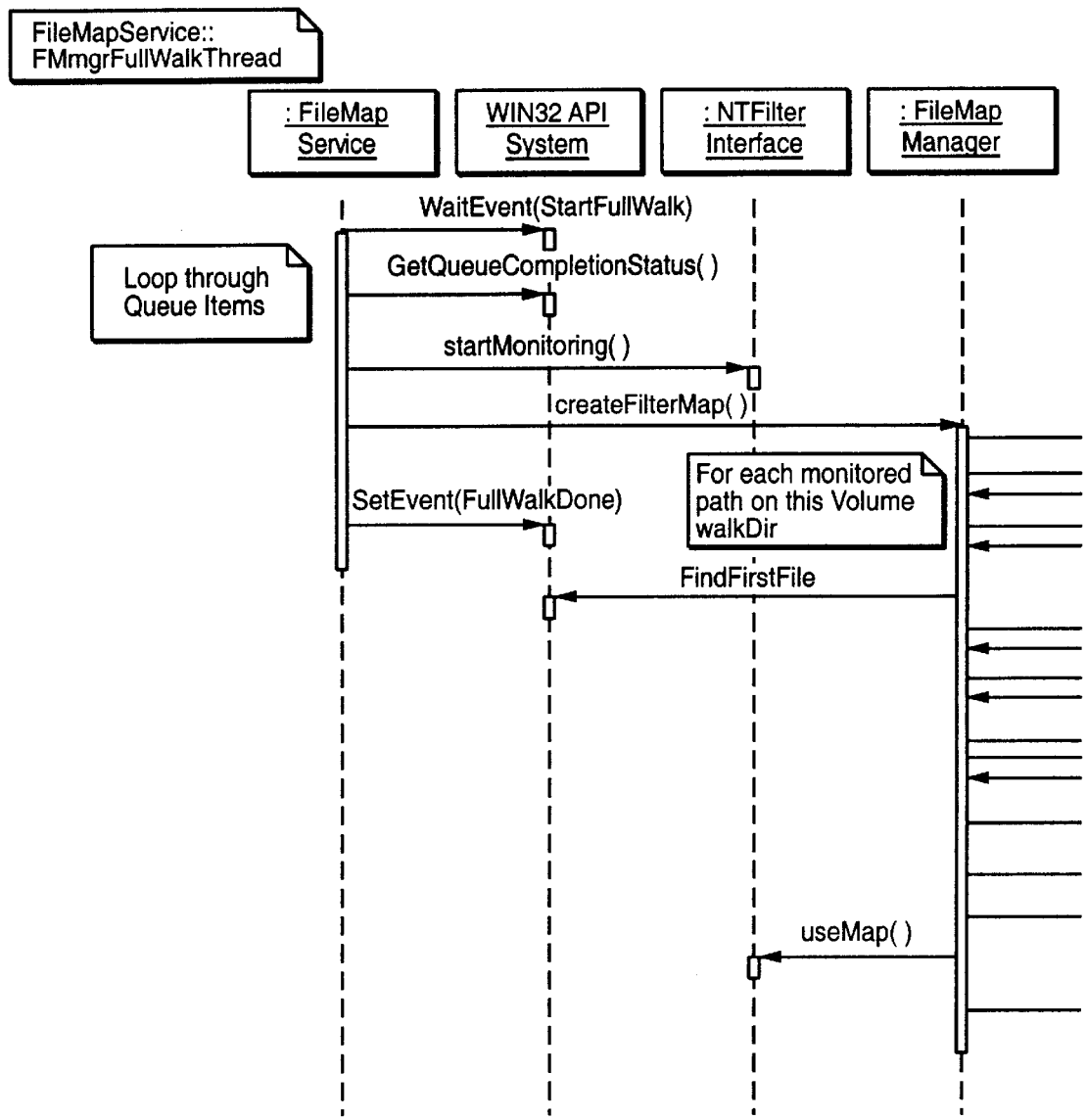
FIG._3D-1

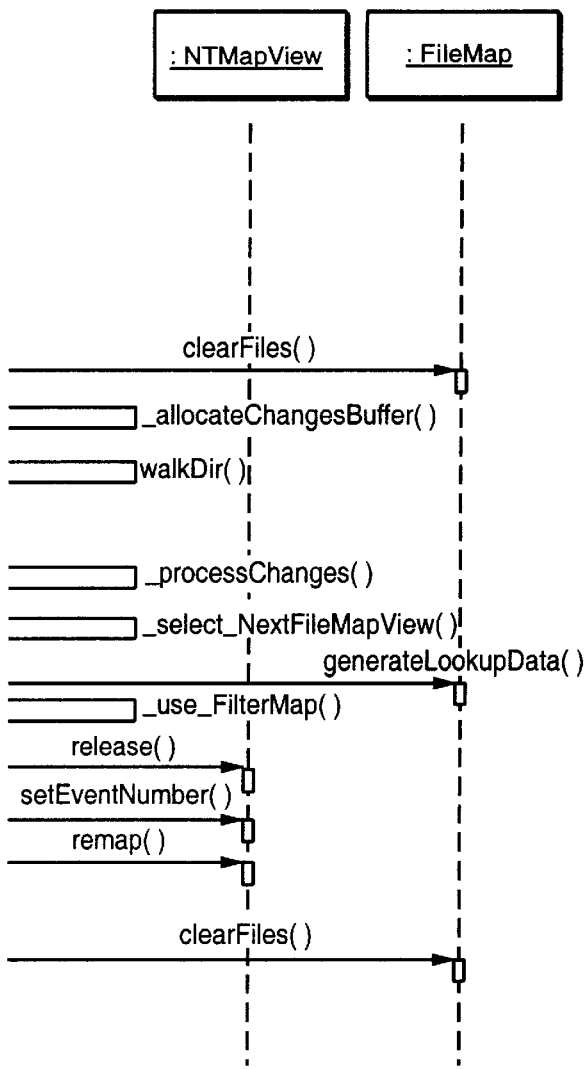
FIG._3D-2
FIG._3D FIG._3D-1 FIG._3D-2

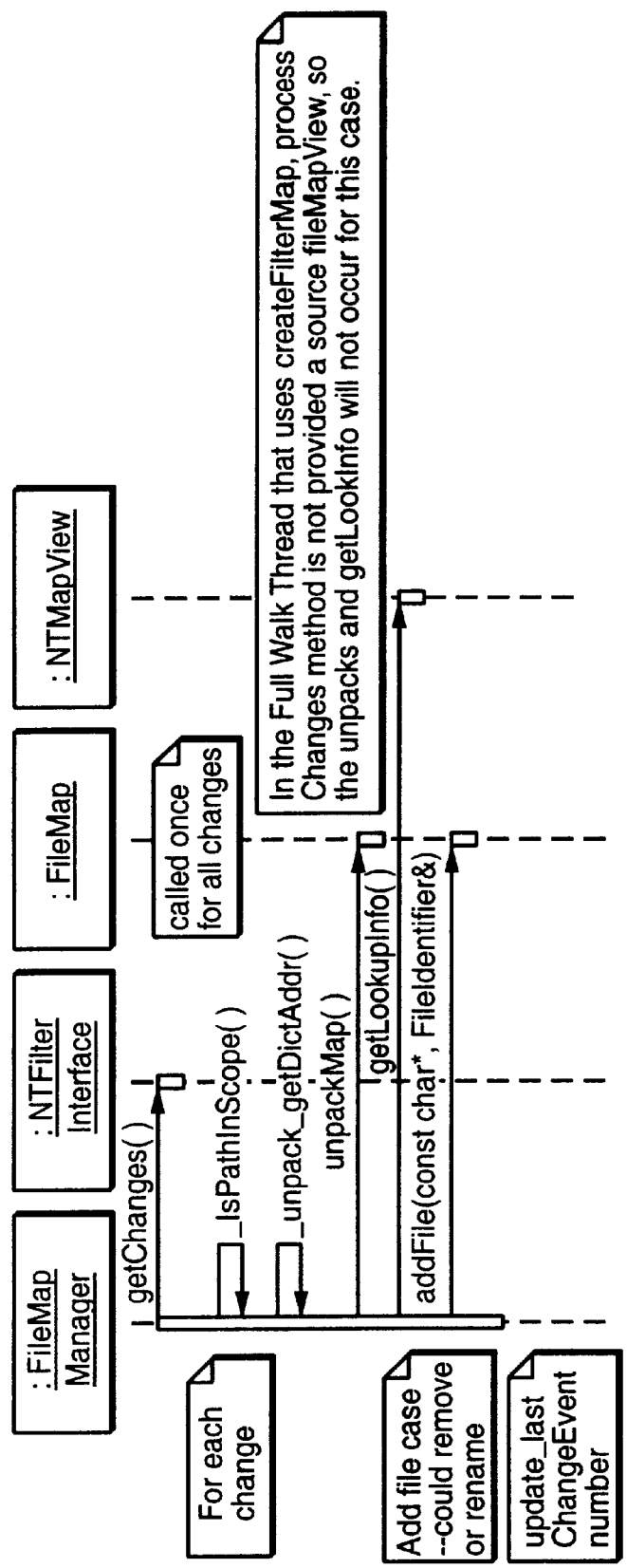
FIG._3F

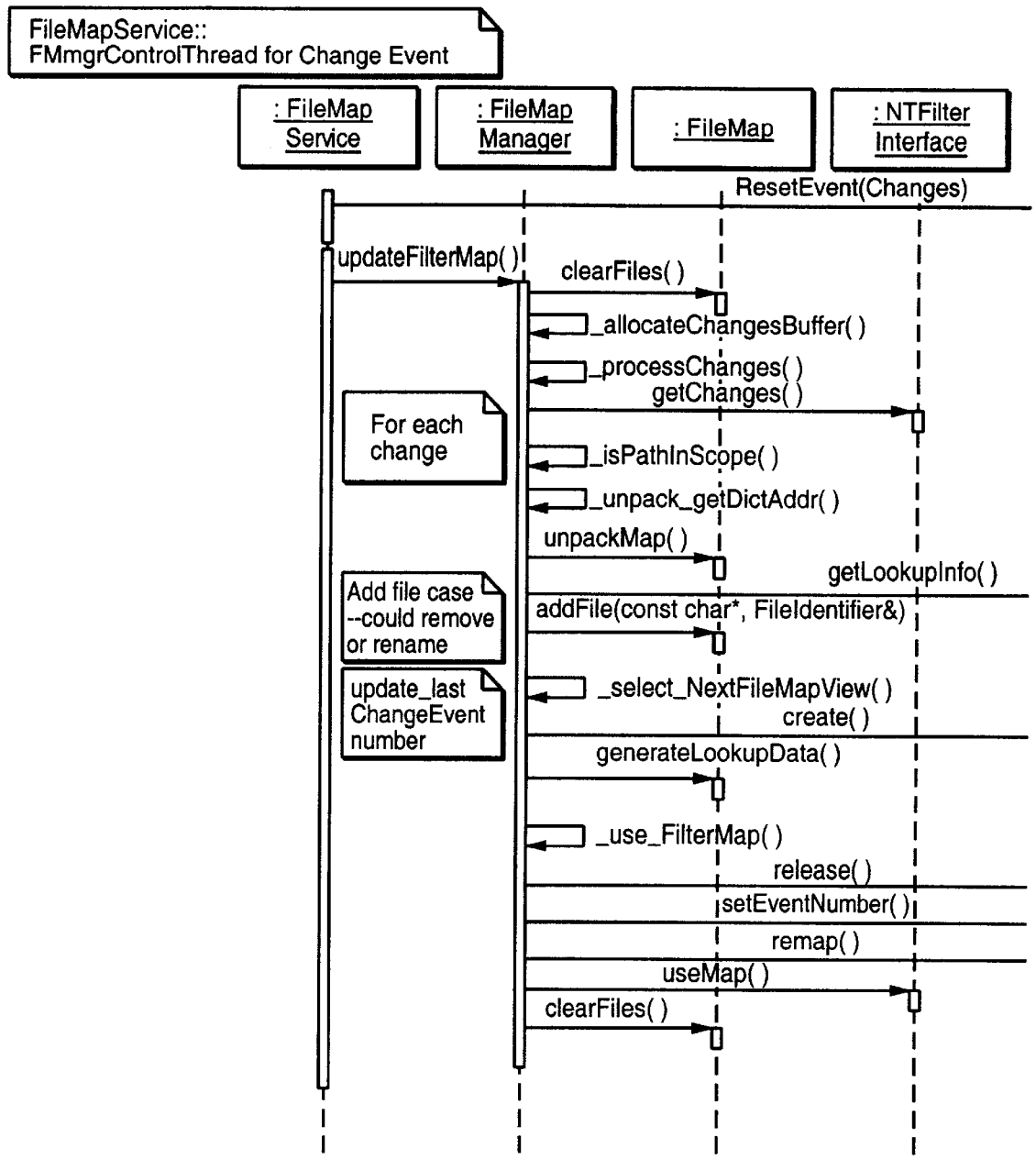
FIG._3G-1

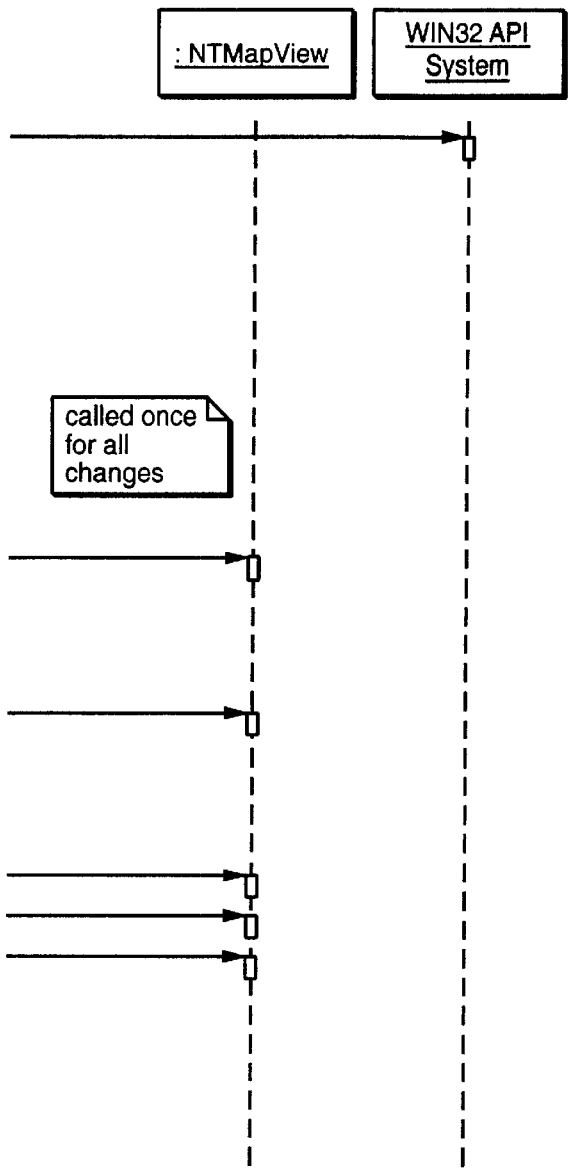
FIG._3G-2

FILE SYSTEM PERFORMANCE ENHANCEMENT

CROSS REFERENCE TO RELATED APPLICATIONS

The present application claims priority from U.S. provisional application No. 60/075,929 filed Feb. 20, 1998, and PCT international application PCT/US99/03710 filed Feb. 19, 1999, designating the United States of America, the full disclosures of which are incorporated herein by reference.

BACKGROUND

The present invention relates to computer system components that perform file system operations.

Modern computers are made up of several different components. Some of these components are physical devices—hardware like the CPU (a central processing unit, such as a microprocessor), main memory (high-speed random access memory), disk drives, keyboard, and so on—and some are software like the applications or programs that the computer executes. One such software component is the operating system, which manages the interaction between the applications that it executes and the physical devices that together make up the computer. Included within virtually every operating system is the concept of a file system. This is the combination of the structure of the data stored on the physical disk drive and the file system driver—a software component that coordinates access to the data.

File systems are generally structured as an inverted tree structure where each node is given a sequence of characters describing it, as well as access restrictions, date and time of creation or access and many other features and information that are specific to the operating system. Each non-terminal node is generally called a directory or folder. Each terminal node is generally called a file. Locating a file to be opened requires parsing a path, which is a string composed of a hierarchical name for the file with each named component separated by some delimiter. For example, on a computer running a Microsoft® Windows operating system (95 or NT), the path "\\Work\Project\Month\Document" indicates the hard disk drive partition (volume) named Work, the directory Project within the root directory of that volume, the directory Month within the Project directory, and the file Document within the directory Month.

The contents of a file may be called file data to distinguish it from meta data. Meta data is "data about data". Meta data is the file system overhead that is used to keep track of everything about all of the files on a volume. For example, meta data tells what allocation units make up the file data for a given file, what allocation units are free, what allocation units contain bad sectors, and so on.

The data that is managed by the file system is generally stored on a mechanical magnetic storage device called a disk drive. For an application program to access a particular file on the disk, a directory lookup must usually be performed. A directory lookup can require: (i) accessing the sectors for each of the directories that are components of the file's path, (ii) retaining the information necessary to access each directory's physical data from disk, and (iii) computing the number of the sector where the file is located on the disk. It is at this point that a request for the operating system to open a file is satisfied. The application can then use operating system functions to read data from the opened file and finally to close the file, releasing any operating system resources being maintained for the file. Because the act of opening a file and reading its contents by performing this directory lookup requires several steps, file systems typically use a variety of techniques to minimize the adverse performance effects of repeating these steps over and over again. The caching of frequently used disk data in memory is one popular technique for minimizing adverse performance effects. Another technique is the indexing of directory data.

File systems commonly use an internal identifier to refer to a directory or file. For some file systems these internal identifiers are long-lived (i.e., persistent) and validly refer to the same file for the life of the file. When accessing a file, the directory lookup determines the internal identifier of each directory in the path, reads each directory's data from the disk, and ultimately locates the internal identifier for the file. The data associated with the file identifier is then read. This data generally includes such attributes as access permissions, file size, file name, and where on the disk the file data is located. Finally, using the cluster information, the file data—the data that a user regards as the contents of the file—is read from the disk.

The overhead associated with directory lookup is both necessary and useful in the general case. However, when an application provides its own mechanism for referring to files, using both the application's lookup mechanism and that of the file system results in duplication of effort. The applications which perform their own mapping to files, and consequently cause this redundancy, are many and diverse. Applications that experience this performance degradation that can benefit from the present invention.

SUMMARY OF THE INVENTION

The invention provides methods and apparatus that enhance the performance of computer file systems, and in particular the performance of read-only operations in such file systems. In the principal embodiment that will be described, the methods and apparatus of the invention are implemented in a suite of computer program modules that together make up a performance enhancement product.

In general, in one aspect, the invention provides a product that transparently exists in an operating system after an initial setup is completed. The initial setup involves identifying what directories or files are to be monitored in order to intercept access requests for those files and to respond to those requests with enhanced performance.

Advantageous embodiments of the invention include one or more of the following features. A system administrator can specify what directories or files are to be monitored by the product. The product automatically creates and maintains a high-performance index of monitored directories or files. It transparently and automatically begins enhancing requests for monitored files whenever the application suite starts running.

Most operations are simply forwarded to the underlying file system driver. However, when a file is opened that is monitored, the open is performed using the file identifier bypassing the access of any directory meta data information.

A further enhancement of the invention is the elimination of access time updates for monitored files thereby eliminating write updates to directory contents, file system meta data and the operating system log file.

In the Windows NT file system NTFS, access to monitored files is enhanced by "pinning" files in the data cache maintained by the NTFS cache manager. Pinning forces the NTFS cache manager to retain file data in memory by leaving an outstanding operation in place (CcMdlRead) until such time as the invention calls the complete operation (CcMdlReadComplete). Maintaining access to the file data in memory for as long as possible increases the likelihood of the file being in memory when the next access request for the file is received.

Replacement of pinned files when available memory is exceeded is performed using a least-recently-used (LRU) selection process. As memory usage for the cache increases, adverse impacts of aggressive memory utilization are mitigated through monitoring of memory usage for other applications and adjusting memory as required.

Additionally, for the NTFS implementation, data operations are processed more efficiently in a number of ways explained in more detail later in the document. It can be configured and its runtime behavior can be controlled through the use of configuration parameters stored in either operating system-provided locations (ie. Windows Registry) or in configuration files read at startup. It provides a mechanism that allows a system administrator to cause all file operation requests to be directed to the standard file system driver without enhancement.

Among the advantages of the invention are the following. It improves the performance of applications that rely on high volumes of file accesses without resorting to a custom implementation of the file system. It improves the performance of applications that perform large numbers of file opens. An example of such a file-open intensive application is a Web server. It reduces the amount of time and resources required to locate and access files stored in a file system. In particular, it reduces the amount of system time and resources spent to obtain access to a file in the file system. It can transparently and automatically allow the standard file system to service access requests for monitored files whenever its operation is stopped. It does not affect requests for access to non-monitored directories and files. It allows a system administrator to direct all file system requests to the standard file system manually. A system administrator can configure and control its runtime behavior. Because it does not replace the native file system, it provides a portable, seamless, and relatively inconspicuous solution. Generally, the invention provides a performance improvement over standard operating system file opens as the number of files increase. Access time is reduced with increasing gains as the number of files being accessed increases.

Computer systems that are used as networked file servers can benefit from the invention. When a request to open a file is received, the path to the file is typically provided. If a computer is acting as a file server connected to a network, the path that is received is most likely a remote representation of the actual file path on the file server. In this case, the file server's network redirector or daemon will perform the file open using a translated version of the supplied path. For some operating systems, keeping the file open indefinitely poses a severe resource drain. To avoid this, older files are generally closed and only reopened as needed. When a large number of files are being served, this reopen and reprocessing of the directory data structures can add significant overhead. The invention reduces this overhead.

World Wide Web (Web) servers can also benefit from the invention. Web servers open files requested by a client on the network, read the file data and transmit the information to the client. By not accessing or altering directory meta data, the invention reduces the work done for an individual request. Therefore each individual request can be handled more quickly (ie. request latency is reduced). The result is that the web server can process more requests in the same period of time.

Computers running document management systems can also benefit from the invention. Such systems typically manage objects by tracking several attributes, not just file names. These attributes are usually indexed and provide a high performance access path to some physical storage identifier for the managed files. In some implementations, the file data managed by the application is simply stored in the file system, which results in a redundant directory lookup to access the file data after the desired file name has been located in the document management system's index. Other implementations avoid this problem by storing file data in a private data store, providing security and high performance access by avoiding the directory lookup and file open overhead associated with storing objects as separate files. Unfortunately, this may then preclude the use of many of the support utilities implemented by operating system and other software vendors. By running the document management application on a computer implementing the invention, the overhead of file system directory lookup is reduced without introducing any of the adverse affects of the private data store.

Another application which can benefit from the invention are mail servers since they can often access and open a large number of smaller files. Generally, any application which performs a large number of file open operations on smaller files will benefit from the invention since the overhead of processing file and directory meta data is a more significant portion of the overall file access operation.

Other advantages and features will become apparent from the following description and from the claims.

BRIEF DESCRIPTION OF THE DRAWINGS

FIG. 1 is a block diagram showing computer system components of an implementation of the invention.

FIG. 2 is a flow chart showing the communication flow of a successful new access request.

FIG. 3a is an object diagram for a component of the implementation shown in FIG. 1.

FIGS. 3b–3g is an interaction diagram for components of the implementation shown in FIG. 1.

DETAILED DESCRIPTION

Figure 4A:
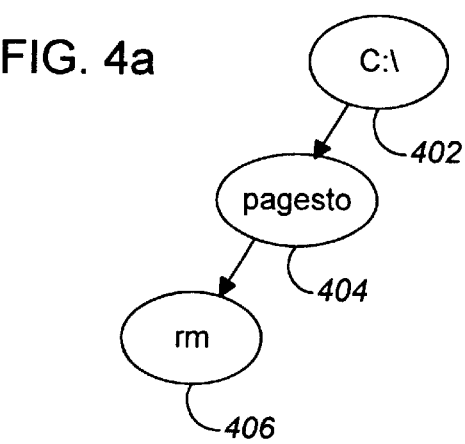
FIGS. 4a–4b illustrate a simple file map tree.

An implementation of the methods and apparatus of the invention in a set of computer program modules that together make up a performance enhancement product will now be described. The product will be referred to by the code name "PerformanceSuite" or by its abbreviation "PS".

An implementation of PerformanceSuite for NTFS will now be described. NTFS is a native file system of the Microsoft® Windows NT operating system, and the described implementation relates to version 4.0 of Windows NT. Files within NTFS are referred to using a persistent internal 64-bit file identifier, the low 48 bits of which are the index of the file's record in the Master File Table (MFT) and the high 16 bits are a sequence number used as an internal consistency check. With NTFS, files can be as large as $2^{64}$ bytes in length and nearly $2^{48}$ files are supported per volume.

The PerformanceSuite product exists transparently in the operating system after an initial setup is completed. The initial setup involves identifying what directories or files are to be monitored. Access requests for those files are intercepted and responded to using product components to improve system performance.

High-Level Components

As shown in FIG. 1, PerformanceSuite has components in both user space (e.g., user-mode code) and kernel space (e.g., kernel-mode code). The main function of the user space components is administration of the kernel space components and the maintenance of the map file, which will be described below. The main function of the kernel space components is to intercept file open requests, find the file ID for the requested file through PerformanceSuite's lookup mechanism, alter the access request to use the file ID, and forward the request to the NTFS file system driver 134, which ultimately completes the request. The file data is remembered by the NT Cache Manager which is influenced by PSService's use of CcMdlRead and CcMdlReadComplete calls to use memory more aggressively and to focus on keeping smaller files in memory. PerformanceSuite also maintains a compressed, layered cache of block level disk information (e.g., Master File Table or MFT data) to prevent the information from being swapped out of memory during high memory stress conditions by normal NT cache manager operations.

Additionally, the PerformanceSuite maintains an LRU listing of monitored files and cached MFT data in a combined fashion so that memory usage can be allocated more efficiently between the two caches. Standard NTFS memory page replacement algorithms vary between single and multi-processor configurations but in neither case is a true LRU algorithm used. The advantages of a true LRU algorithm are significant when a high locality of reference exists as in the case of web server applications.

As depicted in FIG. 1, the user space components include an NT service named PSService 114 and an accompanying control panel applet named CPA (Control Panel Applet) 110. The kernel space components include the two NT filter drivers named PSFilter 130 and PSLowFilter 136.

The map file 120 component of PerformanceSuite can be thought of as existing in both user and kernel space because both PSService and PSFilter interact with the file in their own respective process spaces.

PSFilter 130 and PSLowFilter 136 are started at boot of the system and attached to every local NTFS volume. PSFilter is inserted above the file system, while PSLowFilter is inserted below the file system. Both filters pass requests through until activated by PSService 114. Upon start of PSService, or upon a change in CPA settings, PSService notifies PSFilter of the settings that are in effect. PSService tells PSFilter what volumes to monitor and what map file 120 to use for a given volume. A map file exists for each volume and stores data for any number of paths on that volume.

CPA 110, the control panel applet, provides a graphical user interface for the PerformanceSuite product through conventional I/O devices 102 such as a display device, keyboard, and pointing device. This user interface allows a user to administer the PerformanceSuite product easily and without having to go into the Windows NT registry. Through this user interface, the system administrator identifies and sets parameters that are global to the PerformanceSuite application and parameters that are specific to each NTFS volume. CPA and PerformanceSuite registry entries are described in some detail later in this specification.

FIG. 2, in conjunction with FIG. 1, illustrates the communication flow of a successful open-file access request from an application 112 for a new file, i.e., a file not previously seen by PerformanceSuite. First, the application 112 makes a file access request in order to open the new file for reading (step 202). The NT I/O Manager 132 forwards the request to PSFilter 130 (step 204). PSFilter 130 intercepts the request, finds the corresponding file ID, remembers the file in an LRU data structure, and forwards the request and ID to the NTFS file system driver 134 (step 206). The NTFS file system driver 134 handles the open-by-ID request and a disk read request is forwarded to the disk driver 134 for the file data (step 208). PSLowFilter 136 intercepts the disk read request and does not find the required meta data in its meta data cache, and so it forwards the disk read on to disk driver 138 (step 210). Disk driver 138 reads the meta data from the new file's partition 152 in drive 150 (step 212). PSLowFilter 136, upon successful read completion, remembers the meta data associated with the file (step 214). PSFilter 130, upon successful completion of the open operation, the count of the number of file objects referring to the file is incremented in the LRU data structure; otherwise, no file objects referring to the file remain, the LRU data structure for this file is deleted (step 216). If the open is successful, the file handle data is returned to the requesting process (step 218).

PSService: The NT Service Component

The NT service component of the PerformanceSuite product, called PSService, is a multithreaded, object-oriented, Windows NT service. A service is a user-mode process that implements the Windows NT Service Controller Specification. The main purpose of PSService is to read the registry, create and maintain map files, and communicate with PSFilter for state and information changes.

The main thread of PSService reads the registry settings, communicates the registry settings and initialization to PSFilter kernel-mode module, and creates the control and working set adjustor threads. PSService manages a total of four threads: main service, control, "full walk" and working set adjustor (WSA). "Full walk" refers to a traversal of the directory structure being monitored in a given volume (ie. all files and directories). The goal of the full walk is to produce a map of the file and directory data for subsequent use by PerformanceSuite.

The control thread creates the map file full walk queue, creates the full walk thread which watches this queue, and waits for and handles several events, including the filter changes event, the queue full walk event, the full walk done event, the shutdown all event, and the init new volumes event. The shutdown and init new volumes events are communication events between the main thread and the control thread; the other events are volume-specific. A full walk map file creation occurs for the specified paths of a chosen monitored volume in response to a full walk event. The full walk event signals that PSService has started or that the change log buffer has uncharacteristically overflowed. The control thread also processes the change events for all monitored volumes. An incremental update to the map file occurs when the filter driver PSFilter signals the changes event, which indicates that name space changes have been made to the monitored volume paths (files and directories). Upon successful completion of a full walk, a full walk done event is signaled. In this case or when the incremental update has successfully completed, PSFilter is notified for a particular volume that a new map file exists and is to be used. The change log maintained by PSFilter for the same volume is implicitly cleared to the appropriate change event at this point, too. At initialization and re-initialization time, the init new volumes event is signaled so the control thread reads the registry for volume specific information and acts on it. The shutdown all event is signaled when PSService is requested to stop.

The full walk thread watches the full walk queue, serially processes the entries on the queue and sends a full walk done event for each successful completion.

NT Service Objects

FIG. 3a is an object diagram for PSService and FIGS. 3b–3g are an interaction diagram. The object diagram and interaction diagram are expressed in the notation and with the semantics of the Unified Modeling Language (UML), which is described in Booch et al., The Unified Modeling Language User Guide, Addison Wesley, 1998. The classes referred to in FIG. 3 are described in the following paragraphs.

FileMapService is a singleton object. It is instantiated by PSService and controls most of the functionality of PSService. It instantiates the ValidVolumes object, generates and maintains a list of FM_MgrControlData structures, and creates the multiple threads of the PSService process. PSService itself is a C module that contains the main routine which instantiates a FileMapService object.

The ValidVolumes object maintains a list of valid NTFS volumes that exists on the local system.

FM_MgrControlData is a private data structure of the FileMapService class that is created and put into a list for every monitored volume. The data structure contains a FileMapManager and NTFilterInterface.

ParameterMgr is an abstract (pure virtual) base class that is used to get, set, delete, and iterate through the PerformanceSuite parameters.

NTParameterMgr is a NT-specific implementation of the ParameterMgr class. It uses the registry as its persistent store for parameter data.

RegistryEntry is a nested class of the NTParameterMgr class that is used to retrieve from the registry and set data in the registry.

FileMapManager is a class that represents a volume that is being monitored and the data and functionality associated with managing that volume.

FileMap is a class that holds the unpacked file map. Using the OutputContext object, it transforms an unpacked tree into a packed tree.

The OutputContext object generates output from given low-level data structures into a given or default buffer. FileMap creates this object and uses it to output FileMap data to a MapView.

MapView is an abstract base class providing a memory-based view into the map file.

NTMapView is a NT-specific concrete class providing a memory-mapped view of a file on disk. NTMapView is implemented using shared memory mapping on the map file. This class represents the memory-mapped map file in its packed form.

FilterInterface is an abstract class that is a base class for PerformanceSuite filter interfaces.

NTFilterInterface is the NT-specific implementation of the FilterInterface abstract class. It encapsulates all communication with the underlying filter device driver for the Windows NT platform.

Change Log and Map

To allow communication of state between user space and kernel space components, a series of control operations are defined. There are two major varieties of these operations, based on whether the operating system in question is a UNIX variant or Windows NT. The following description is directed to a Windows NT implementation. Implementation in a UNIX variant is described later in this specification.

Two major data structures are used to communicate between the user space and kernel space. These are the change log and the map. The change log is maintained in a fixed size structure in memory. The contents are extracted by PSService and used to create a new map based on these changes and the contents of an existing map. The map is a memory structure communicated using shared a memory section backed by a file on disk.

The change log contains multiple entries, one for each namespace change to the file system. A namespace change event is a file creation, deletion or rename event, which includes a directory rename event. Other change events are not logged, such as file extension, modification or access time updates, and security changes, as these do not modify the namespace.

Each change log entry contains the information shown in the following table.

| | |
|---|---|
| EventNumber | Unique identifier for this change event record. |
| EventType | Defines the specific namespace event this is for: AddPath, DeletePath or RenamePath. |
| FileIdentifier | This is the combination of the Sequence number and MFT record number for WindowsNT; it is an inode number and generation number for most UNIX variants. |
| Flags | Bit flags indicating options. |
| PathLength | Number of path characters (not bytes). |
| RenameLength | Number of rename path characters (not bytes). |
| Path | The path and possibly rename path characters that define the particular file name affected. These are Unicode characters (16 bits) on Windows NT and single-byte characters on UNIX variants. The order is the path followed by the rename path. |

Every namespace change event produces an entry, which can be obtained by the appropriate file system request.

The map is passed into PSFilter as soon as possible upon rebuilding it with changes obtained from PSFilter's change log. In order to limit wasted data copy time, this transfer is done through shared memory. Generally, PSService creates a new map composed of the pre-existing directory tree data combined with the changes obtained from the change log maintained by PSFilter. This map is provided using the USE_MAP control. The application of a map causes several changes to occur. The first is that the new map replaces any old map. If there is no current map, the new map is simply installed. Causing a map to be installed when no map was previously installed allows PSFilter to redirect opens using the new map. USE_MAP cannot succeed when logging is disabled on a partition because the correctness of the given map cannot be assured if changes are not being monitored. Another thing that occurs when a new map is supplied is that the committed event number stored within the map is used to commit any events that are the same as, or earlier than, the committed event number. Committed events are removed from the change log, freeing memory for new namespace change events. The newly supplied map now contains the updates.

Several consistency checks are done within PSFilter using data within the map. One check is that the version number of the map is an expected value. Also the offsMap, sizeMap, offsDict, sizeDict, and numDictEntries are checked to ensure no overlap with each other, no references beyond the end of file, and no overlap with the map header.

PSFilter

PSFilter is a filter driver that attaches itself to all of the local NTFS volumes for a given system at boot time. A driver is a portion of kernel-mode code that implements the Windows NT Driver Model Specification. All requests intercepted by PSFilter are forwarded to the NTFS without any manipulation until PSFilter is notified by PSService as to which directory/volume combinations to monitor. PSFilter intercepts all IRPs (I/O request packets) that flow to the targeted volumes. IRP major functions that PSFilter intercepts are described in the following table.

When updates occur to the monitored directories, PSFilter continues to forward directly any requests for that given file to the standard NTFS. During updates the change log is used in conjunction with PSService to ensure that the map file is in sync with what has been updated to disk. At the major level, PSFilter has to watch for IRP_MJ_CREATE, IRP_

| | |
|---|---|
| IRP_MJ_CREATE | PerformanceSuite's lookup, open-by-ID IRP manipulation happen here. |
| IRP_MJ_CLOSE | A file marked to be deleted-on-close is deleted by NTFS here. Therefore, a change log entry must be made for any file closed with the DeleteOnClose option set. |
| IRP_MJ_CLEANUP | To delay cache tear down, the delivery of the final cleanup to a pinned file is delayed until the corresponding file data is unpinned from the cache. In addition, if the file being cleaned up is marked for deletion, an entry is added to a list associating the name of the file with a PFILE_OBJECT allowing the change log entry to be properly recorded at close time. |
| IRP_MJ_FILE_SYSTEM_CONTROL | See explanation below. |
| IRP_MJ_QUERY_INFORMATION | Provide correct responses for files that have been opened by ID, as NTFS cannot provide name information for files opened by ID. |
| IRP_MJ_SET_INFORMATION | Rename is done through this dispatch point. For any rename, PerformanceSuite must make a corresponding change log entry. A file extension or truncation will cause the file to become unpinned to prevent cache consistency issues. |
| IRP MJ_READ | A monitored file that is read might be pinned in the cache at this point. If it is already pinned, the file will be marked as least recently accessed. A read request for a pinned file where no outstanding locks exist will be handled completely by the PSFilter driver. This process is hereinafter referred to as "read shunting". This includes non-MDL_READ, MDL_READ and MDL_READ_COMPLETE requests. In the same way, the FAST_IO routines (FastIoRead, MdlRead, MdlReadComplete) are handled as well |
| IRP_MJ_WRITE | Prior to file extension, a file that is currently pinned will be unpinned. In the same way, the FAST_IO routines (FastIoWrite, PrepareMdlWrite, FastIoWriteCompressed) are handled as well. |
| IRP_MJ_LOCK_CONTROL | After every lock operation, a check is done to see if any outstanding locks exist. If any exist, a flag is set to prevent read shunting for this file. In the same way, the FAST_IO routines (FastIoLock, FastIoUnlockSingle, FastIoUnlockAll, FastIounlockAllByKey) are handled as well. |

PerformanceSuite also intercepts mount requests through the major function IRP_MJ_FILE_SYSTEM_CONTROL.

Although all IRP_MJ_CREATE IRPs are intercepted, only when certain conditions are met does PerformanceSuite attempt to manipulate its IRP. The manipulation involves altering the IRP to use the file ID by changing the name to be the actual file ID plus setting some flags within the IRP in order to indicate this is an OPEN_BY_ID. Normal forwarding of the IRP to the NT file system driver is completed while at the same time the accessed files are remembered and kept in memory by the cache mechanism. Some of conditions for manipulating the IRP are as follows: the volume is being monitored, i.e., change logging is on and a map file exists for the volume; the FILE_OBJECT associated with the IRP has a name associated with it; the RelatedFileObject is null; the create disposition is FILE_OPEN or FILE_OPEN_IF; delete access is not requested for the file; the desired access is not (SYNCHRONIZE|FILE_EXECUTE); neither option FILE_OPEN_BY_FILE_ID or FILE_DIRECTORY_FILE is set; neither IRP flag SL_CASE_SENSITIVE or SL_OPEN_TARGET_DIRECTORY is set; and the file identifier is successfully found in the map.

MJ_SET_INFORMATION, IRP_MJ_CLOSE, IRP_MJ_CLEANUP, and possibly IRP_MJ_SHUTDOWN IRPs in order to catch all data-synchronization events that may affect the integrity of the map file.

Communication with PSService is accomplished through custom control codes specified in the FsControlCode field of the IRP_MJ_FILE_SYSTEM_CONTROL IRP's IO_STACK_LOCATION. The following table describes the FsControlCodes that are used by PSService.

| | |
|---|---|
| PS_USER_FS_START | Initialize change log for a given volume. |
| PS_USER_FS_STOP | Stop monitoring changes and free memory-mapped map file. |
| PS_USER_FS_GBT_CHANGES | Get change log entries that currently exist for the monitored volume. |
| PS_USER_FS_SET_PARAMETERS | Set any global configuration settings. |
| PS_USER_FS_GET_PARAMETERS | Get current global configuration settings. |
| PS_USER_FS_USE_MAP | Use given map file for given volume. |
| PS_USER_FS_COMMIT_CHANGES | Free change log up to given event. |
| PS_USER_FS_SIGNAL_CHANGES | Cause the indicated event to be signaled when the change log for the target volume contains at least the LowWaterMark number of change entries. |

The PS_USER_FS_START request causes change log monitoring to begin on the indicated volume. On successful completion, no map is installed. In response, PSFilter does not redirect requests using the file identifier information, but simply monitors changes. In this way, it is ready for a USE_MAP control request to begin full operation. This request accepts no input or output arguments. The request is targeted to a monitored volume, such as \Device\HardDisk0\Partition1. The result is STATUS_SUCCESS on success. STATUS_DEVICE_BUSY is returned if the partition is not stopped.

The PS_USER_FS_STOP request causes any current map to be unloaded and change log maintenance on the volume halted. Because no map exists, filter redirection using map data is prevented. This request accepts no input or output arguments. The request is targeted to a PerformanceSuite monitored volume, such as \Device\HardDisk0\Partition1. The result is one of STATUS_SUCCESS on successful completion, or STATUS_UNEXPECTED_IO_ERROR if the volume is not currently started.

The PS_USER_FS_UNLOAD request causes a stop to be issued to all volumes. This accepts no input or output arguments. The target of this operation is the PerformanceSuite control interface (\Device\PerformanceSuite). The result is STATUS_SUCCESS.

The PS_USER_FS_GET_CHANGES operation uses the following data structures.

The target of the PS_USER_FS_GET_CHANGES request is a monitored volume, such as \Device\HardDisk0\Partition1. The input to this request is a PS_GET_CHANGE_INPUT structure. This structure contains a Wait field that basically informs PSFilter if the operation should block until a change appears on the target volume. The LowWaterMark field indicates that the operation should block until at least those numbers of change events are available or the available buffer space is exceeded. The size of the input buffer is the size of the PS_GET_CHANGE_INPUT structure. The result is a PS_GET_CHANGE structure. The NumberOfChanges field indicates how many changes are written into the supplied buffer. The NumberOfChangesRemaining field indicates how many changes remain in the change log to be retrieved. The Changes field is variable in length and extends to the end of the supplied input buffer. Each change indicates its size in bytes (64-bit aligned), with each change record following immediately after the next. In this way the size field is also the offset of the next change record.

The PS_USER_FS_GET_CHANGES request returns STATUS_SUCCESS in all but four cases. The first occurs when the next change record is too large to fit in the supplied buffer. In this case STATUS_BUFFER_OVERFLOW is returned. The next case occurs when the change pool overflows within the filter driver. In this case the STATUS_NO_LOG_SPACE is returned. The next case occurs when attempting to get changes for a stopped volume. In this case STATUS_UNEXPECTED_IO_ERROR is returned. Finally, if while waiting for a change, change recording for a volume is disabled by another thread, the code STATUS_NO_MORE_FILES is returned.

The PS_USER_FS_USE_MAP request uses the following data structure.

```
typedef unsigned char Octet;
typedef unsigned long DoubleWord;
typedef Octet MapFileVersionId[4];
typedef unsigned short WideChar;
//
// This will return true if the newer event is actually newer
// than the older event. Typically the Older than or Equal test
// will be performed using the negation of this macro.
//
#define isEventNewer( older, newer ) \
( ( ((older) > 0xBFFFFFFF) && ((newer) < 0x3FFFFFFF)
) ? \true : \
```

```
typedef enum PS_Eventenum {Addpath, Deletepath, RenamePath}PS_EVENT_TYPE;
typedef struct _PS_CHANGE {
    unsigned long Size;           // Size of this structure
    unsigned long EventNumber;    // Unique identifier for this record
    LARGE_INTEGER FileIdentifier; // Sequence # and MFT record number
    PS_EVENT_TYPE EventType;      // AddPath, DeletePath or Renamepath
    unsigned short Flags;         // PS_CHANGE_FLAG_xxx flags
    unsigned short PathLength;    // Number of Unicode path characters
    unsigned short RenameLength;  // Number of Unicode rename chars
    unsigned short Path[1];       // Actually: Pathlength+Renamelength+1
}PS_CHANGE, *PPS_CHANGE;
typedef struct _PS_GET_CHANGE_INPUT
    int           Wait;           // Boolean flag, non-zero is true.
    unsigned long LowWaterMark
}PS_GET_CHANGE_INPUT, *PPS_GET_CHANGE_INPUT;
typedef struct _PS_GET_CHANGE
    unsigned long  NumberofChanges;
    unsigned long  NumberofChangesRemaining;
PS_CHANGE Changes[1];
}PS GET CHANGE, *PPS GET CHANGE;
```

```
( ( ((older) > 0xBFFFFFFF) && ((newer) < 0x3FFFFFFF)
) ? \false : ( newer > older ) ) )
//
// The following structure represents the header of a map file
//
    typedef struct _MapFile_Header_struct {
        MapFileVersionId version;
        DoubleWord sizeThisHeader; // includes length of 'paths'
        DoubleWord flagDirty; // Only modified by the filter
        DoubleWord lastCommittedEvent;
        DoubleWord highModificationTime; // High 32 bits of
            mod time
        DoubleWord lowModificationTime; // Low 32 bits of mod
            time
        DoubleWord crc; // for validation
        DoubleWord offsMap, sizeMap;
        DoubleWord offsDict, sizeDict;
        DoubleWord numDictEntries;
        DoubleWord device; // Device Designator (On NT this is
            C, D . . . )
        DoubleWord numpaths; // count of Null-separated paths
            in 'paths'
        WideChar paths[1]; // list of paths, double-Null terminated
    } MapFileHeader, *MapFileHeader_Ptr;
    typedef struct _PS_USE_MAP {
        unsigned long NameLength;
``` unsigned short Name[1]; // Unicode Characters }PS_USE_MAP, *PPS_USE_MAP;

The target of the PS_USER_FS_USE_MAP request is a monitored volume, such as \Device\HardDisk0\Partition1. The input to this request is a PS_USE_MAP structure. This structure names an existing shared memory section. The section is opened and mapped into system space by PSFilter. The section must begin with a MapFileHeader structure that locates the other data structures within the section. As a map contains the event number that is committed within it, a USE_MAP request is an implicit commit-changes request. This route is the preferred mechanism for committing entries within the change log. Any events within the change log whose event number is within 0x3FFFFFFF of the lastCommittedEvent and is "Older Than or Equal To" the lastCommittedEvent is assumed to be recorded within this map and is to be removed from the change log. This relationship is defined by the isEventNewer macro, which handles sequence number wrapping. That macro assumes that PerformanceSuite cannot have more than 0x3FFFFFFF outstanding uncommitted events. In this way a simple comparison can be done in most cases. The exceptions are when the older and newer events are at the opposite ends of the range of numbers. The isEventNewer macro and the MapFileHeader structure are defined in the preceding table. The status STATUS_INTERNAL_DB_CORRUPTION is returned if the map header fails its consistency checks, the old map is not released.

The PS_USER_FS_COMMIT_CHANGES request uses the following PerformanceSuite-specific data structures.

typedef struct _PS_COMMIT_CHANGES {
    unsigned long EventNumber;
}PS_COMMIT_CHANGES, *PPS_COMMIT_CHANGES;

The target of the PS_USER_FS_COMMIT_CHANGES request is a monitored volume, such as \Device\HardDisk0\Partition1. This request causes all events that are less than or equal to the indicated event to be marked as committed. PSFilter can discard committed events. This is not the common path to commit events. PS_USER_FS_USE_MAP is intended to be the normal way to commit events. This mechanism exists to allow events to be committed during a long running update such as a full directory walk, preventing overflow of the change log buffer.

The PS_USER_FS_SIGNAL_CHANGES request uses the following data structure.

typedef struct _PS_SIGNAL_CHANGES {
    HANDLE Event; // Event to signal when low water mark reached
    unsigned long LowWaterMark;
    unsigned long IdleSeconds;
}PS_SIGNAL_CHANGES, *PPS_SIGNAL_CHANGES;

The target of the PS_USER_FS_SIGNAL_CHANGES request is a monitored volume, such as \Device\HardDisk0\Partition1. This request causes the indicated event to be signaled when the change log for the target volume contains at least the LowWaterMark number of change entries. This allows a single thread to wait for changes on a variety of partitions using the WaitForMultipleObjects Windows API. The IdleSeconds field indicates the number of seconds that are allowed to elapse, with at least one change in the change log, before the event is signaled. In this fashion, it is easy to ensure that the change log eventually becomes flushed while still making an effort at obtaining changes in groups to minimize processing overhead. If the IdleSeconds field is 0, then it is assumed to be effectively infinite and no idle signaling is performed.

The PS_USER_FS_GET_PARAMETERS request uses the following data structures.

```
typedef struct _PS_PARAMETERS {
    unsigned long   ChangeLogSizeInBytes;
    unsigned long   MapValidationWaitPeriod;      // Milliseconds
    unsigned long   MaximumBytesPinned;
    unsigned long   MaximumPinnedBytesPerFile;
    unsigned long   DelayedCleanupProcessRate;    // Files per minute
    int             AllowCachePinning;
    int             PreventAccessTimeUpdate;
    int             AllowOpenByFileId;
}PS_PARAMETERS, *PPS_PARAMETERS;
```

The target of the PS_USER_FS_GET_PARAMETERS request is the PerformanceSuite control interface (\Device\PerformanceSuite). This request takes a PS_PARAMETERS structure as an output buffer and takes no input buffer, only returning an I/O status. The parameters control the internal functioning of PSFilter with respect to cache maintenance and managing the change log. The parameters are basic tuning parameters. Each has a default value that is assumed at PSFilter initialization time, and each can be altered by an application. A definition of each parameter is given in the following paragraphs.

ChangeLogSizeInBytes is the size of the change log. Because change log entries are variable in size, and to ensure high performance, the change log is sized as a single pool of paged memory managed as a circular list. If insufficient space exists to insert an entry, an error condition exists. The next attempt to obtain a set of changes indicates that a change was lost, allowing PSService to begin its recovery process. ChangeLogSizeInBytes defaults to 64K bytes.

MapValidationWaitPeriod is the time in milliseconds to allow a map file to be marked as dirty (i.e., invalid) before attempting to mark it as clean (i.e., valid). The default value is 10,000 milliseconds. There must be no change log entries made for this length of time, and the log must be empty indicating that all changes are present within the current map file. When this occurs, the map file is marked as valid by the filter and the change flushed to disk. The next change forces another disk operation to invalidate the dirty flag.

MaximumBytesPinned is the maximum number of bytes that can be pinned by PerformanceSuite cache management. This is intended to be a substantial portion of memory, as pinning the memory is the mechanism used to provide the operating system with an LRU cache. This cannot exceed available physical memory and is also constrained to be a minimum of 64 pages. The default value is 70% of memory in excess of 24 MB. This ensures that sufficient memory can be made available to allow the proper functioning of the system, while still allowing a generous allocation to the cache. Compare this to the File System Cache limit which is approximately 90% of all memory.

MaximumPinnedBytesPerFile is the largest file for which PerformanceSuite performs any cache pinning. PSFilter does not affect the caching of larger files. The default size is 64K bytes.

DelayedCleanupProcessRate is the rate that files are unpinned from the cache such that the least recently used file is unpinned first. In this fashion, memory is not held pinned for any excessively long period, making memory available for other applications. The default is 600 files per minute.

AllowCachePinning is a boolean flag set non-zero when pinning of files in the cache is allowed. This is non-zero by default.

PreventAccessTimeUpdate is a boolean flag set non-zero when PerformanceSuite disables access time updates for files that are monitored. This is non-zero by default.

AllowOpenByFileId is a boolean flag set non-zero when PerformanceSuite allows the use of the map file to determine a file's internal identifier and to change an open to be done by identifier instead of by name. This is non-zero by default.

The PS_USER_FS_SET_PARAMETERS control option takes the same structure as the PS_USER_FS_GET_PARAMETERS, a PS_PARAMETERS structure, but as an input buffer with no output buffer being used.

PS Low Filter Driver

The PerformanceSuite Low Filter Driver (PSLowFilter) is a disk block caching filter driver that filters I/O requests directed to NTFS volumes. It maintains a block level disk cache only for selected NTFS meta data (such as the MFT data). Its purpose is to ensure efficient access to NTFS meta data under stressful cache situations where the Windows NT Cache Management begins to degrade. PSLowFilter works in conjunction with PSFilter through the LRU mechanism. Basically, the NTFS meta data is cached in PSLowFilter for files that PSFilter deems necessary. PSFilter manages the disk block cache using its LRU mechanism. The block level disk cache is maintained in memory in a compressed form using standard Run Length Encoding (RLE) compression/de-compression algorithms described in detail later.

The overall filtering device driver logic of PSLowFilter includes a DriverEntry method that attaches to all NTFS volumes and filters of any necessary I/O requests to interact with the operating system properly. This includes the filtering of disk read and write requests.

PSLowFilter uses a write-through block level cache to satisfy read requests. The blocks are allocated on an as-needed basis using nonpaged pool system memory.

PSLowFilter layers itself over the device objects representing physical disks (i.e., partition 0), and partitions (e.g., partition 1, partition 2). PSLowFilter potentially layers itself over class driver device objects.

PSLowFilter has to start very early in the boot process, before any file system drivers are loaded. It must be loaded before the boot partition's file system driver is loaded. If this were not the case, then boot partitions would be excluded from caching, which is unacceptable. NTFS supports removable media other than floppy disks. NTFS typically locks removable media in the drive when the volume is mounted and requests an unlock from the driver at volume dismount. PSFilter detects a dismount; and when it is completed, volume monitoring is disabled until remounting occurs. Because a dismount is intercepted in this manner and PSLowFilter is informed to disable caching, format operations to mounted volumes are handled properly.

For NTFS meta data to be cached effectively, it is essential that meta data be distinguished from file data on disk. Because PSLowFilter lies below the NTFS, it cannot take advantage of any of the file system controls provided by the NTFS. Instead, it must examine the on-disk data structures directly. The module whose interface is defined in the following table provides this functionality. Note that this module does no locking, depending instead on the caller to have acquired some resource shared for all calls except PsNTFSInitialize, PsNTFSUninitialize and PsNTFSUpdateData, which require exclusive access. In most cases, the caller has the device extension's resource. The only exception is when PsNTFSUpdateData requires special lock handling. This call only has to be made when the MFT's initial and self-referential record is being updated and PsNTFSShouldUpdateData returns true. This minimizes the calls to PsNTFSUpdateData. These and other methods are defined in the module header as shown in the following table.

```
//
// The PsNTFSInitialize method will examine the indicated
    target device
// to see if it contains the data structures for a supported
    version of NTFS.
// If it does a context will be allocated for the related methods
    exported
// from this module. STATUS_SUCCESS will be returned.
    If the device is
// not a supported NTFS version then STATUS_INVALID_
    DEVICE_REQUEST will
// be returned. Finally if the context could not be allocated,
    then the
// code STATUS_INSUFFICIENT_RESOURCES will be
    returned.
//
NTSTATUS
PsNTFSInitialize(
    IN PDEVICE_OBJECT Device,
    OUT PVOID *Context
);
//
// The PsNTFSUninitialize method will destroy the context
    created from
// a previous call to PsNTFSInitialize. Any associated
    resources will
// be released. The context pointer should not be used at any
    point after
// this call.
//
VOID
PsNTFSUninitialize(
    IN PVOID Context
);
//
// The PsNTFSContainsMetadata method will return TRUE
    if the indicated
// range of bytes on disk intersects with the NTFS MFT File.
    Any overlap
// with the range of the MFT file will cause a TRUE return,
    else FALSE
// will be returned. Because the size of the MFT file is not
    fixed, at
// any update to the MFT file, a given byte range on disk may
    become MFT
// data or stop being MFT data. In other words, the state of
    whether or
// not a particular block on disk is Metadata is not permanent
    and can
// change.
BOOLEAN
PsNTFSContainsMetadata(
    IN PVOID Context,
    IN PLARGE_INTEGER StartingLbo,
    IN ULONG Bytes
);
//
// The PsNTFSShouldUpdateData method will return TRUE
    if the indicated
// range of bytes on disk intersects with Metadata that
    requires a call
```

```
// to PsNTFSUpdateData. Using this call avoids having to
    lock down
// buffers unnecessarily during a write operation. This call is
// very fast, accessing only data stored within the context.
//
BOOLEAN
PsNTFSShouldUpdateData(
    IN PVOID Context,
    IN PLARGE_INTEGER StartingLbo,
    IN ULONG Bytes
    );
//
// The PsNTFSUpdateData method must be informed when-
    ever a Metadata block
// is written. It can be called for any changes to the volume
    the context
// is defined for, but must be called for Metadata related
    changes in order
// to track the range of the Metadata files on the NTFS
    Volume. When a
// a change occurs to the NTFS MFT file, run list information
    for the MFT
// file may change and that is the only event that this method
    is tracking.
// As such it has very little overhead. Unfortunately it
    requires access to
// the Buffer, which is not free in all cases. To eliminate this
    potential
// overhead at every write, the PsNTFSShouldUpdateData
    method should be used.
//
VOID
PsNTFSUpdateData(
    IN PVOID Context,
    IN PLARGE_INTEGER StartingLbo,
    IN ULONG Bytes,
    IN PVOID UpdatedBuffer
);
//
// The PsNTFSClusterSize method will return the size in
    bytes of a NTFS
// on disk cluster. This is merely accessing an internal field
    and is very
// fast. This is not expected to be needed, but is provided to
    give the
// filter's cache management algorithms the option of using
    the cluster
// size as their internal block size.
//
ULONG
PsNTFSClusterSize(
    IN PVOID Context
);
//
// The PsNTFSMFTRecordSize method will return the size
    in bytes of a NTFS
// MFT Record. This is merely accessing an internal field and
    is very
// fast. This is not expected to be needed, but is provided to
    give the
// filter's cache management algorithms the option of using
    the record
// size as their internal block size.
//
ULONG
PsNTFSMFTRecordSize(
    IN PVOID Context
);
```

PSLowFilter supports two custom device control operations: PS_USER_CACHE_ENABLE and PS_USER_CACHE_DISABLE. The former enables disk caching on a volume, providing the necessary procedures to support block management within the cache. PS_USER_CACHE_ENABLE also provides a set of procedures that provide the replacement algorithm for the block cache. These procedures define the lifetime of the cached entries and the actual replacement algorithms for, and sizing of, the cache. PS_USER_CACHE_DISABLE disables caching, freeing any blocks currently maintained by PSLowFilter.

In order to allow for a restriction of the memory usage to a commonly managed pool for PSFilter and its cache, PSFilter maintains access data on the blocks held by PSLowFilter. PSFilter informs PSLowFilter when blocks should be purged. In order to perform this notification, PSLowFilter informs PSFilter when a new block that is desired to be cached has been read into the cache, and also when a read or write to an existing cached block occurs. The procedures PS_BLOCK_NEW and PS_BLOCK_ACCESS passed in and out of the PS_USER_CACHE_ENABLE device control provide the notification of these events.

The PS_BLOCK_NEW method handles the case where, during a call to itself, the PS_BLOCK_PURGE method is invoked. The locking is structured such that a deadlock situation does not occur and such that any overage of the memory allotted for caching will be short lived. If the code calling the PS_BLOCK_NEW has allocated a buffer, as soon as it informs the high-level driver of the fact, using the PS_BLOCK_NEW method, the high-level filter driver will purge other blocks from the cache to make room, if necessary. Note that the purge could occur in the same thread context as the thread that is used to notify the higher-level driver.

PSLowFilter does not cache all blocks accessed; that is done by the NT Cache Manager. PSLowFilter only caches meta data blocks as defined by the PsNTFSContainsMetadata method. PSLowFilter simply passively filters access to any other blocks. Blocks on disk are identified by the Virtual Byte Offset within the MFT file (abbreviated "VBO") and the number of bytes that make up the block. All control communication to the specific volumes are through the use of custom device control codes.

The type definitions for the device controls, and the device controls themselves, are defined in the following table.

```
//
// Define event codes and their associated data types.
// These are valid arguments to be supplied to the
// PS_BLOCK_EVENT callback.
// The following EventCode values are defined:
// PS_BLOCK_EVENT_FORMAT—The disk has begun
    being formatted.
// No argument buffer is supplied. (i.e., Argument is NULL)
//
//
#define PS_BLOCK_EVENT_FORMAT (0x00000001)
//
// Define the cache maintenance procedure signatures.
//
// The "lower-level" filter exposes the purge function
    typedef NTSTATUS (*PS_BLOCK_PURGE)( PVOID
        Context, PLARGE_INTEGER StartVbo, ULONG
        Bytes );
```

```
// The following three functions are exposed by the "higher-
     level" filter
   typedef NTSTATUS (*PS_BLOCK_NEW)( PVOID
     Context, PLARGE_INTEGER StartVbo, ULONG
     Bytes );
   typedef NTSTATUS (*PS_BLOCK_ACCESS)( PVOID
     Context, PLARGE_INTEGER StartVbo, ULONG
     Bytes );
   typedef NTSTATUS (*PS_BLOCK_EVENT)( PVOID
     Context, ULONG EventCode, PVOID Argument );
//
// The following structures are the expected arguments to the
// PS_USER_CACHE_ENABLE Device Control opera-
     tion.
// The Context is to be returned in every callback invocation.
// The MaximumUnused field, defines the number of cache
     blocks
// that are allowed to be maintained on an internal lookaside
// list to enhance performance.
// The CacheBlockSize is the size of a cache block, which
     when 0
// defaults to the cluster size of the volume or the system
     page
// if the cluster size is smaller than that. This should always
     be
// a multiple of the system page size and is an error if not.
// The NewProc is invoked when a non-cached disk block is
     accessed
// by the device and cached.
// The AccessProc is invoked for every disk read/write
     operation
// allowing the maintenance of access pattern data.
//
typedef struct _PS_CACHE_ENABLE_INPUT {
   PVOID Context; // Typically callers device extension
   ULONG MaximumUnused; // Size of unused blocks
     lookaside
   ULONG CacheBlockSize; // If 0 Defaults to cluster size.
   PS_BLOCK_NEW NewProc; // A new block is being
     cached.
   PS_BLOCK_ACCESS AccessProc; // An existing block
     was accessed.
   PS_BLOCK_EVENT EventProc; // A significant disk
     event ocurred.
}PS_CACHE_ENABLE_INPUT, *PPS_CACHE_
   ENABLE_INPUT;
typedef struct _PS_CACHE_ENABLE_OUTPUT {
   PVOID Context; // Typically device extension.
   PS_BLOCK_PURGE PurgeProc; // Block should be
     purged from cache
}PS_CACHE_ENABLE_OUTPUT, *PPS_CACHE_
   ENABLE_OUTPUT;
//
// The code PS_USER-CACHE_ENABLE expects both
     input and output buffers.
// These should be an input buffer of a PS_CACHE_
     ENABLE_INPUT type
// and an output buffer that is an PS_CACHE_ENABLE_
     OUTPUT type. If
// successful it will cause a lookup map to be unloaded for
     the
// volume and cause caching on the target device to be
     initiated.
// The target of this control operation will be a disk volume
     such as
// \Device\HardDisk0\Partition1. A successful control opera-
     tion will
// return STATUS_SUCCESS. If caching is already enabled
     then the
// STATUS_DEVICE_BUSY code will be returned. If
     insufficient resources
// were available to set up caching then STATUS_
     INSUFFICIENT_RESOURCES will
// be returned. If the device is not an NTFS Volume, then
// STATUS_INVALID_DEVICE_REQUEST will be
     returned.
// Finally if any of the enabling settings are invalid, then
// STATUS_INVALID_PARAMETER is returned.
//
#define PS_USER_CACHE_ENABLE \
   CTL_CODE(FILE_DEVICE_DISK, 3072,
     METHOD_BUFFERED, FILE_ANY_ACCESS)
//
// The code PS_USER_CACHE_DISABLE expects no
     argument buffers. It will
// cause block level caching to be disabled for the target
     device. The
// target of this control operation will be a disk volume such
     as
// \Device\HardDisk0\Partition1. A successful control opera-
     tion will
// return STATUS_SUCCESS. If caching is not already
     enabled then the code
// STATUS_UNEXPECTED_IO_ERROR will be
     returned. //
#define PS_USER_CACHE_DISABLE \
   CTL_CODE(FILE_DEVICE_DISK, 3073,
     METHOD_BUFFERED, FILE_ANY_ACCESS)
```

The write-through block level cache component is an integral part of PSLowFilter, the meta data caching filter device driver. It is discussed separately to focus on the issues most relevant to caching. There are several major aspects to caching. These include what to cache, how and when to load or discard cache data, how to control the size of the cache and the elements in the cache, and how to maintain internally what is cached. PerformanceSuite uses the cache to satisfy disk read requests and ensures proper cache maintenance during disk writes.

As far as what to cache, only NTFS meta data is cached. It is identified using the PsNTFSContainsMetadata method. Only blocks that get a TRUE result from that method are cached. In addition, the specific volume must have been successfully enabled for caching using the PS_USER_CACHE_ENABLE device control.

The read and write dispatch methods determine how and when to load and/or discard cache data. The steps of these methods are shown by the flow outline shown in the following table.

1) When a disk read or write operation occurs against a block not containing NTFS meta data:
   a) Pass the disk operation onto the underlying disk driver.
2) When a disk write operation occurs against NTFS meta data
   a) Pass the disk write operation on to the underlying disk driver.
   b) If the write fails, skip the following steps.
   c) If the block is cached:
      i) Update the cached block in memory.
      ii) Inform the meta data module of the change using the PsNTFSUpdateData method. If accessing the buffer is expensive, use the PsNTFSShouldUpdateMethod to ensure the update is needed. Only one cluster on a volume requires this attention. Note that accessing the buffer requires mapping into the system virtual address space. Therefore, it is prudent always to use PsNTFSShouldUpdateMethod.

iii) Inform the high-level driver of the access to the block by calling the PS_BLOCK_ACCESS method.

d) If the block is not cached:

i) Create a copy of the block using system memory allocated from nonpaged pool.

ii) Register this block internally such that the cache can later determine if data within this block is cached.

iii) Inform the meta data module of the change using the PsNTFSUpdateData method. If accessing the buffer is expensive, use the PsNTFSShouldUpdateMethod to ensure the update is needed. Only one cluster on a volume requires this attention.

iv) Inform PSFilter of the creation of the cached block by calling the PS_BLOCK_NEW method. PSLowFilter expects (potentially) to be invoked (in a recursive manner) by PSFilter in the context of the calling thread. All of this processing occurs at high IRQL (interrupt request level).

3) When a disk read operation occurs against NTFS meta data:

a) If the block is found in the cache:

i) Inform PSFilter of the access to the block by calling the PS_BLOCK_ACCESS method.

ii) Satisfy the read operation from the block in cache, completing the IRP without ever calling the underlying disk driver.

b) If the block is not found in the cache:

i) Forward the request onto the underlying disk driver.

ii) In the completion procedure, perform the following tasks:

(1) If the read failed, then skip all remaining steps below.

(2) If the block is already in the cache because of a race condition, inform PSFilter of the access by calling the PS_BLOCK_ACCESS method and skip the remaining steps below.

(3) Otherwise, create a copy of the block using system memory allocated from nonpaged pool.

(4) Register this block internally such that the cache can later determine if data within this block is cached.

(5) Inform PSFilter of the creation of the cached block by calling the PS_BLOCK_NEW method.

Each time a read or write is done against a block in the cache, the PS_BLOCK_ACCESS method is called to allow the PSFilter driver to provide support for a reasonable replacement algorithm. In addition, for each write against cached data, the PsNTFSUpdateData method is invoked to ensure that changes to the layout of the NTFS meta data files are tracked. It is possible that the on-disk data structures are not consistent with regards to what is supposed to be meta data, which may result in some blocks being incorrectly cached. Eventually the file system synchronizes changes down to the on-disk data structures and any incorrectly cached blocks are eventually pushed from the cache.

The internal block size is not constrained by the interface and can even be variable. However, PSLowFilter uses a fixed block size to simplify its internal block maintenance. PSLowFilter uses a multiple of the system page size as the cache block size. The CacheBlockSize field in the PS_USER_CACHE_ENABLE device control provides the size of the cache block that is used.

To avoid deadlock between PSFilter and PSLowFilter, and to ensure no resource acquisition problems occur, a resource acquisition hierarchy is adopted. This is defined as follows. First, PSFilter never asynchronously calls into PSLowFilter with any resources acquired. Second, resources belonging to PSLowFilter are always acquired before any resources belonging to PSFilter. Third, PSFilter can expect to be invoked at (relatively) high IRQL by PSLowFilter and therefore avoids usage of any synchronization objects other than spin locks. And fourth, when PSFilter recurs back into PSLowFilter (e.g., PSLowFilter invokes PS_BLOCK_ACCESS which in turn calls PS_BLOCK_PURGE), the recursion takes place in the context of the original invoking thread. The caller is free to use spin-lock-guarded routines.

This section describes a very simple lossless encoder/decoder that is both very fast and reasonably efficient in compressing data that is cached by PSLowFilter. The data has large runs of 0 octets and also has frequent small integer values. The run-length encoding therefore uses a simple control octet with optional data octets to represent the source data. The control octet is formatted as will now be described. When describing nonrepeated data, in Control octet 1ixxxxxx, the i bit indicates if the data is inline. When inline, the xxxxxx bits contain a single octet value with the high two bits being 0. When not inline, the xxxxxx bits indicate the number of data octets following (in excess 1 notation, so 1 byte is stored as 000000, 2 octets, as 000001, and so on). When describing repeated data, in Control octet 0zxxxxxx, the z bit indicates if the data to be repeated is a zero and therefore no repeated octet follows. If data is not zero, the octet following is the value to be repeated. In any case, the xxxxxx bits indicate the number of times to repeat the octet in excess I notation. Thus, for example, 00000000 00000000 00010102 46469672 compresses to 480101C2 01468196 72 (all numbers in this example are hexadecimal).

General Initialization and Startup Operation

Upon boot of a system that has the PerformanceSuite product installed, the following occur. PSFilter starts. Ignoring all registry settings and using hard-coded default values where possible, PSFilter attaches to all currently available NTFS volumes. Intercepted IRPs are directly forwarded to the native NT file system driver without modification. Until directed to do so by PSService, PSFilter does not do any of the following: start logging changes made to the monitored areas, use its own map file, attempt to open files by file ID, or attempt to pin files in the NT cache managers cache.

Upon startup PSService creates a map file that contains meta data and file identifiers for each monitored volume indicated in CPA. PSService also communicates the following to PSFilter: start monitoring a given volume—which means when to start watching for changes; use a given map file for a given volume; set global and volume-specific parameters which are used during runtime; get the specific settings that PSFilter is currently using; stop monitoring a particular volume—the user can indicate this through CPA; get the changes made to a specific monitored volume's set of paths; and commit or clear the change log because the changes have been incorporated into the map file.

When PSService starts, it reads and remembers registry settings, finds all available NTFS volumes on the system and remembers them, sends initialization file system control (set_parameters) to PSFilter to share global registry settings, loops through all of the NTFS volumes and using the registry information that indicates what volumes PerformanceSuite is to attach to, and sends a file system control to PSFilter saying to start monitoring the desired volumes. This causes the volume-specific change logs to be initialized.

In addition, USE_MAP requests are sent to PSFilter for every volume that is desired to be monitored once the map files are created. This keeps the change log flag set so changes are remembered, and it resets the flag that causes the open_by_file_IDs to occur along with caching the file information in the LRU cache.

PerformanceSuite maintains an accurate synchronization between the file information it maintains in its map and the actual file data residing in monitored folders. Because open-for-update requests that occur for files in monitored folders are forwarded to the standard file system driver, PerformanceSuite is designed to be able to update the map whenever necessary.

PerformanceSuite provides a mechanism that allows the system administrator to manually request the map file to be created or re-created. In addition, it provides a mechanism that allows the system administrator to specify specific dates and times for the map file to be created or re-created, periodic time intervals for the map file to be created or re-created, and control of the disk location of the map file. It automatically re-creates the map file each time the application starts, as well as allows access to monitored files to be serviced by the standard file system driver while the map file is being created.

Control Panel Applet (CPA)

CPA, the control panel applet, is the graphical user interface for the PerformanceSuite product. This user interface allows a user to administer the PerformanceSuite product easily and without having to go into the Windows NT registry. Through this user interface, the system administrator identifies and sets parameters that are global to the PerformanceSuite application and parameters that are specific to each NTFS volume. Some examples of the registry settings that can be exposed to the user through CPA are PerformanceSuite Volume-specific Configuration Information and PerformanceSuite Global Configuration Information.

In PerformanceSuite Volume-specific Configuration, three settings are typically seen by the user: volumes to which the filter drivers (PSFilter and PSLowFilter) attach and which the filter drivers monitor, corresponding directories, and locations to store the map file or files. Drive letters like D:, E:, and F:, are displayed to the user for available volume options. Many directories under a given volume can be chosen for monitoring. CPA provides the system administrator with the ability to select multiple volume directories for each selected volume. The primary map file associated with a given volume can be stored anywhere on the computer—this is left up to the system administrator. A secondary map file location may be available to be set by the system administrator so lookups can occur during data synchronization cycles. It is advantageous to spread these files across different drives. CPA gives the user the ability to choose the location for these files. Although these files are always recreated upon startup of PSService, it is advantageous to allow administrators control over their locations during runtime because the files can be very big for large directory structures.

In PerformanceSuite Global Configuration, four parameters are typically seen by the user: Change Log Size (ChangeLogSizeInBytes), Maximum Amount of Memory to be used by PerformanceSuite (MaximumBytesPinned), and Delayed Cleanup Rate (DelayedCleanupProcessRate), and the maximum size of files to be pinned (MaximumPinnedBytesPerFile). These parameters are all described elsewhere in this specification.

CPA updates the registry with this configuration information once it is applied or saved, then it notifies the NT PSService that it should read the registry. CPA displays summary and general information as well.

CPA operates to provide: read and display of PerformanceSuite-relevant registry information in an intuitive presentation; write capability of PerformanceSuite-relevant settings indicated by the fields of the CPA user interface to the registry; validation of registry entries for both read and write; print summary of registry settings; and notification to PSService as to when the registry is ready to be read. PSService provides and executes any other functionality that is a result of the changes made to the registry by a user using CPA. PSService always reads the entire registry when notified by CPA to refresh itself, and PSService performs comparisons with the old and the new settings with regards to making any decisions about whether it needs to react or not to the new settings.

The CPA user interface is made up of tabs within a window that contain the global buttons described in the following table.

| | |
|---|---|
| OK | If necessary applies the changes to the registry, then sends a message to PSService that indicates that the registry should be read, and finally quits CPA. |
| Cancel | Quits CPA without sending any message to PSService. |
| Apply | Update the registry with the current settings. Will not be enabled until the user has made some setting changes; |
| Help | Initiate the on-line help. |

These buttons are available to all of the tabs. When CPA is started, the registry is read and the internal data structures and consequently the user interface elements of CPA are populated. If any invalid registry settings are found, hard-coded defaults are used in the place of the invalid data. Data input into CPA is validated as entered.

The Volume Parameter Settings Tab of CPA enables the user to do the following: on a per drive basis, turn monitoring on or off; add and remove specific directory paths to be monitored within the specified drive; and view and modify the location of the map file for the specified drive.

The Drive pull-down box only displays valid NTFS volumes that are currently mounted and available on the machine. The displayed text is the portion of the DOS device name that indicates the corresponding drive letter—e.g., D:—along with an icon referring to a disk drive. The choice made in this box controls the settings and text displayed in all of the other elements on this tab.

For the selected drive, the Monitor Radio Buttons display the current monitor setting, either on or off. Monitoring has two parts: filtering and recording updates as they occur; and filtering open requests and attempting to use the lookup/open_by_ID/cache mechanism when appropriate. The user interface hides the monitoring differentiation from the user. PSService actually turns monitoring on and off, but CPA displays the state. Changing monitor on/off selection causes the corresponding registry setting to be set once Apply or OK is hit. PSService then sends the requests to the filter drivers to start or stop monitoring the given volume. If no directories to monitor are chosen for a drive, the on/off radio buttons are disabled and monitoring is off for the drive. If the last monitored directory is deleted for a drive, monitoring is turned off. When the user adds a directory, the radio buttons are enabled.

During system startup, as has been mentioned, the filter drivers come up first, then PSService. Until PSService comes up, update recording occurs for all volumes that the filter drivers attach to, reads the registry, and tells the filter drivers what to monitor. Open requests are filtered for a chosen volume only after PSService starts. In an initial installation, monitoring is turned off. CPA is brought up after the post-installation reboot, which allows the user to select directories and turn on monitoring for a volume.

In the Monitor Group Box and List Box, the, "Directories on Drive D," title is changed according to the indicated drive. For example, if drive F is selected, the title is "Directories on Drive F". The list box add and delete icon buttons allow directories to be added or deleted. This list is used in creating the map file that enables the lookup mechanism to find an ID based on a path. The delete icon button is only enabled when an entry is selected in the list box. The add icon button is always enabled. The add icon button does not place the user into the list box row and allow typing or browsing, it only allows browsing at this point in order to help avoid user input mistakes. The user is therefore forced into the Browse for Folder dialogue. The Browse for Folder button is a standard directory browse dialogue with the restriction that the user can only add directories within the current drive. Whenever the drive is switched using the drive pull-down field, the corresponding directories within this list box is displayed. The paths identified in this list box are written out to the registry for the given volume when Apply or OK is hit.

The primary and secondary map file locations are displayed in the Assign Lookup File Location Group Box. The primary file location is the file that is created that contains the lookup information for the contents of the identified directories for this volume. A secondary location is used in order to handle updates without affecting PerformanceSuite functionality—i.e., a double buffering technique is used so that when PerformanceSuite is updating the map file, another frozen copy can be used during that update period. The initial primary and secondary settings are switched when updates occur. It allows the user to pick the location of where to place these files so that more efficient space configuration can be done; however, PerformanceSuite always generates the name for the file. By default both the primary and secondary files are identified at the root directory of the given volume. The map files are non-persistent in that they are deleted when PSService is stopped and are recreated upon restart of PSService.

The Advanced Properties button pops up an Advanced Lookup File Properties Dialogue that gives the user the capability of moving the primary and secondary map files into other directories. There is an Advanced Lookup File Properties Dialogue Drive which is a read-only text field that indicates the drive set from the parent dialogue. The Primary and Secondary text fields found here are read-only and cannot be typed in. The user must select the Browse button in order to get the Browse for Folder Dialogue that allows the user to change the location of the map files. The Browse for Folder Dialogue is a standard directory dialogue choice dialogue.

The Summary tab lists information about all drives and directories that PerformanceSuite is monitoring and each drive's primary and secondary map file locations. The information listed in this tab is read-only. The only functionality available to the user within the Summary tab is for printing.

Registry Entries

PerformanceSuite uses registry settings under several subkeys. The tuning and configuration parameters are under two types of subkeys—settings that are global to the PerformanceSuite application and settings that are specific to each volume. Not all of these settings are exposed to the end user of PerformanceSuite.

The global parameters subkey is "HKEY_LOCAL_MACHINE\SOFTWARE\Suite\Systems\PerformanceSuite\Parameters\Global". The settings that exist on a per-volume basis are stored at a corresponding subkey located under the global parameters subkey. Each volume is represented by its own subkey, which indicates the device name—e.g., " . . . \PerformanceSuite\Parameters\D", " . . . \PerformanceSuite\Parameters\F", and so on.

The table below shows value name and value data settings for the PerformanceSuite registry subkeys.

```
[HKEY_LOCAL_MACHINE\SOFTWARE\Suite Systems\PerformanceSuite\Parameters\Global]
(Global settings)
"ChangeLogSizeInBytes"=dword:???????          // memory size to allocate for change log
"MaximumBytesPinned"=dword:???????            // memory ceiling filter used by LRU
                                              // cache
"MaximumPinnedBytesPerFile"=dword:???????     // max file size that is placed in LRU
"DelayedCleanupProcessRate"=dword:???????     // files per minute that are unpinned
"AllowCachePinning"=dword:00000001            // turn off LRU cache pinning?
"PreventAccessTimeUpdate"=dword:00000001      // on by default
"AllowOpenByFileId"=dword :00000001           // on by default
"FlushCacheOnStopMonitoring"=dword:00000001   // flush cache on stop
"MaxNumberFullWalkRetries"=dword; 3           // # consecutive FullWalk failures . . .
                                              // . . . allowed before volume shutdown
"MaxNumberFullWalkThreads"=dword; 1           // # threads to service FullWalk queue
"GlobalSharesPrefix"="PerformanceSuite"       // String prefix used throughout the code
[HKEY_LOCAL_MACHINE\SOFTWARE\Suite Systems\PerformanceSuite\Parameters\D]
(Volume specific)
"IsMonitored"=dword:00000001                  // monitoring on or off
"FWlnterval"=dword:0001d4c0                   // fullwalk interval flag-default a week
"MapPath_1"="d:\\psdrvD1.dat"
"MapPath_2"="d:\\psdrvD2.dat"
"DeleteLookupMapsOnStopMonitoring"=dword:0001 // delete .dat files (i.e., map files)
"ChangeLogReadBuffer"=dword:00003E80          // default 16000
"ChangeLogMinEntries">dword:0000001F          // default 16
"ChangeLogIdleSeconds"=dword:00000078         // default 120
"Path_1"="\temp"
```

-continued

```
"Path_2"="\t-mt"
"Path_3"="\T1"
"Path_N"="..."
[HKEY_LOCAL_MACHINE\SOFTWARE]
"Suite Systems\PerfomanceSuite\1.00.000"        //version information inserted by
                                                InstallShield.
                                                //This is a key with no data values.
[HKEY_LOCAL_MACHINE\SYSTEM\CurrentControlSet\Services\PerformanceSuite]
//Filter Driver Initialization code
"Type" = dword:00000001
"Start" = dword:00000002
"Group" = "File System"
"Image Path" = "\\SystemRoot\\system32\\drivers\\psfilter.sys"
"ErrorControl" = dword:00000001
```

Map File

The map file is the data store of meta data and file identifiers that is created by PSService for the chosen monitored directory/volume combinations—i.e., the map file represents all of the files and their corresponding file IDs that are present under the chosen monitored directories. This provides an alternative mechanism of finding file IDs very quickly as compared to using the NTFS lookup mechanism.

The map file is broken into three sections: the header, the file map, and the dictionary. In addition to defining the map file version, the device and the monitored paths, the header contains information regarding the size and location of the file map and the dictionary. It also contains information that facilitates mutually exclusive updates to the map file. The file map represents a tree where each file is represented by a series of nodes of the tree. The dictionary stores the most frequently occurring strings that can be found in the file map.

The map file is loaded into memory by PSFilter and used when attempting to find the file ID for a given file.

Each monitored NTFS volume has one and only one map file associated with it. Each map file can contain references to one or many directories associated with the given volume. For data synchronization purposes, each volume really has a primary and secondary map file associated with it at any given time. The secondary file is a copy of the primary file, which is refreshed whenever updates have to occur and is then swapped with the primary file when the updates are committed. This double-buffering mechanism is used to allow the filter to operate successfully while at the same time handling real-time updates and changes to the monitored directories. The map file is refreshed for each volume upon startup of PSService—i.e., map file persistence is not attempted in order to avoid possible corruption.

Figure 4B:
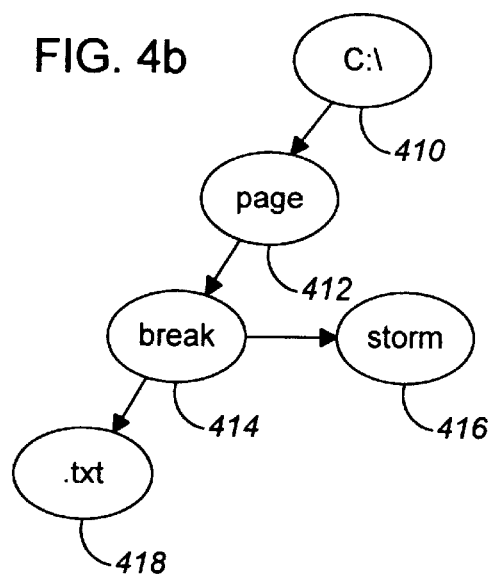

As illustrated in FIGS. 4a–4l b, the data representation of the map files is abstracted as a tree. For each file there is a series of nodes, starting from the root node, that each contain a part of the full filename string. Each node can contain up to seven characters. For example, if the monitored directory is "C:\" and the only file within this directory is "pagestorm" then the data would look like the tree in FIG. 4a. The node 406 represents a child node where the file ID information is stored. The filename is spread across two nodes 404, 406 because, in this implementation, the maximum number of characters per node is seven. The first node 402 only contains three characters because a "\" character (representative of a directory) forces the remainder of the filename string to be continued at a child node. A data break also occurs if the filename has an extension. An extension is defined, for convenience, as six or fewer characters that come at the end of a filename and are preceded by a period. An extension is placed within its own node. If the number of characters after the period exceeds six then the data break is ignored.

If multiple files within a monitored directory start with the same substring then those files share the corresponding nodes within the tree. In addition, a nodal split occurs after the last character that the two filenames have in common. For example, if the file "pagebreak.txt" were added to the monitored directory of the previous example, then the tree would look like FIG. 4b. The two monitored files start with the string "C:\page". Therefore, they share the first two nodes 410, 412 in the tree ("C:\" and "page"). A nodal split occurred at the "page" node. The "break" and "storm" nodes 414, 416 each represent children of "page". In short, a new child node is needed when any of the following conditions occurs: a "\" character is encountered; an extension is encountered; a character limit is exceeded; or a nodal split is desired because two or more files have the same initial substrings. Node 418 represents the extension ".txt" of "pagebreak.txt".

A node may have an unlimited number of children even though it is restricted to only one child pointer. All of the children of a particular node are linked together using peer pointers. Like the child pointer, there can only be one peer pointer per node. This peer list is always sorted alphabetically. Therefore, a parent node always has its child pointer set to the first child node in alphabetical order.

In addition to the file map tree, the map file also contains a dictionary. The function of the dictionary is to store the most frequently occurring strings that can be found in the file map tree. For example, the string extension ".htm" might occur numerous times within a file map tree. Instead of storing ".htm" at every leaf node for every hypertext file, the string is stored once in the dictionary. Any node that has a dictionary string needs stores an offset rather than the data itself. This technique is used to conserve space.

Not every node references the dictionary. One useful set of criteria for entry into the dictionary are as follows: the string must occur at least four times (the complete string of a single node); the string must contain at least four characters; and the string must be one of the 64K most frequently used strings.

As the file tree grows larger, the file map and dictionary also grow larger. The header specifies how big each of the other two sections are and where to find them.

Whenever a modification (e.g., add, delete, rename) occurs within a monitored directory, the map file needs to be repaired. To do this, PerformanceSuite makes a copy of the map file and marks the current map file as dirty. All lookups continue to be directed at the dirty map file until PerformanceSuite has had a chance to update the new copy. Once the new copy correctly reflects the new state of the file system, PerformanceSuite redirects its lookup to the new map file.

The dictionary of the map file has two parts. The first part, called the lookup table, is an array of 4 byte offsets, indexed starting at 0. Each name data entry in the dictionary has one of these offset values. The offset value determines the location of the string relative to the beginning of the dictionary. The second part is the actual name data as counted strings. The first byte of the data is a count of name bytes, with that many bytes of name data following.

The interpretation of the raw data is more complex. The data's function is to represent, in as few bits as possible, the file map tree structure. In the tree structure each node contains these attributes: a peer pointer, which can be null; a child pointer, which can be null; a data value, which is either the actual data itself or an offset into the dictionary; and a file ID if this is a leaf node. Each node has a series of bits that define its structure and attributes. These bits are grouped into octets, which are interpreted as one of six types: Control, Offset, Lookup, Device ID, File ID, and Name. The first octet for all nodes is the Control Octet. The Control Octet serves as a high-level definition of the node. It provides information about the pointer attributes (i.e., peer and child) and the type and number of subsequent octets associated with this node. Therefore, the Control Octet specifies how many bits are needed to define this node and the order in which they should be parsed.

TABLE 2

The Five Octet Types That Can Follow a Control Octet

| Octet Type | Meaning |
| --- | --- |
| File ID Octets | Sequences of octets broken into nibbles which are rounded to an octet boundary. The format is platform specific. For Windows NT, this is composed of two numbers - a sequence and a MFT number. The sequence is the high 16 bits and the MFT record number is the low 48 bits of the File ID. This is encoded by having the first nibble indicating how many low MFT nibbles there are and the second nibble indicating how many low sequence nibbles there are. Any nibbles not indicated are assumed to be zero. For example, the value 0x0002000000001987 would be encoded as 0x41219870. The "4" indicates that there are four MFT nibbles ("1987") and the "1" indicates that there is one nibble needed for the sequence ("2"). The trailing "0" is needed to round off the octet boundary. |
| Name Octets | Simple sequence of valid octets for a URI. |
| Lookup Octets | 1 of 2 octets (when 2 it is msb then lsb) which together define an index into the dictionary lookup table. |
| Offset Octets | 1, 2, 3 or 4 octets of data (most-significant-octet to least-significant-octet) which together define the offset to the first child node of this node. The length is defined in excess 1 notation, so a value of 0 indicates 1 octet of data, and so on. |
| Device ID Octets | Defined in a platform specific fashion. For Windows NT this is a single octet indicating the drive letter of the logical drive the following nodes are relative to. |

As mentioned previously, each node is represented by a series of octets, starting with a Control Octet. Below is a table of the seven valid sequences of Control Octets.

TABLE 3

The Seven Valid Control Octet Sequences

| Control Octet | Subsequent Octets | Meaning |
| --- | --- | --- |
| 0 p 0 oo nnn | <Name Octets> <Offset Octets> | Branch Node with Name Data and 1 to 4 Offset Octets to its first child |
| 1 p 0 oo 0 dd | <Lookup Octets> <Offset Octets> | Branch Node with 1 or 2 Lookup Octets and 1 to 4 Offset Octets to its first child |
| 1 p 0 oo 1 ii | <Offset Octets> | Branch Node with actual dictionary offset and 1 to 4 Offset Octets to its first child |
| 0 p 1 00 nnn | <Name Octets> <File ID Octets> | Leaf Node with Name Data and File ID |
| 1 p 1 00 0 dd | <Lookup Octets> <File ID Octets> | Leaf Node with 1 or 2 Lookup Octets and a File ID |
| 1 p 1 00 1 ii | <File ID Octets> | Lead Node with actual dictionary offset and a File ID |
| 1 p 1 00 1 ii | <File ID Octets> | Leaf Node with actual dictionary offset and a File ID |
| 1 p 1 11 1 11 | <Device ID Octets> | Device ID and p always will be 1 |

• p is 1 when this node has a peer following it (note: leaf nodes can have a peer).
• oo defines the number of child offset octets in excess of 1.
• nnn defines the number of Name Octets (0–7).
• dd defines the number of Dictionary Lookup Octets (1 or 2).
• ii defines the actual Dictionary Lookup Index.
• 00 3bits are used to indicate a File ID Lookup.

To clarify, the following table 4 outlines, in order, each of the subsections of the raw data in the example. The Name and Device ID octets and the File ID octets have been preserved for readability.

TABLE 4

Translating The Example

| Section | Data | Binary Equivalent |
|---|---|---|
| 1 | FF "D" | 1111 1111 "D" |
| 2 | 03 "D:\" 05 | 0000 0011 "D:\" 0000 0101 |
| 3 | 03 "PS\" 05 | 0000 0011 "PS\" 0000 0101 |
| 4 | 41 "A" 11 | 0100 0001 "A" 0001 0001 |
| 5 | 41 "B" 13 | 0100 0001 "B" 0001 0101 |
| 6 | 41 "C" 17 | 0100 0001 "C" 0001 1001 |
| 7 | 41 "D" 19 | 0100 0001 "D" 0001 1101 |
| 8 | 03 "XYZ" 1B | 0000 0011 "XYZ" 0010 0001 |
| 9 | A4 51 "21 60 C3" | 1010 0100 0101 0001 "21 60 C3" |
| 10 | A4 54 "FF FF 16 0C 40" | 1010 0100 0101 0100 "FF FF 16 0C 40" |
| 11 | A4 51 "11 60 C5" | 1010 0100 0101 0001 "11 60 C5" |
| 12 | A4 51 "11 60 C6" | 1010 0100 0101 0601 "11 60 C6" |
| 13 | 24 ".DLL" 51 "JJ 60 C7" | 0010 0100 ".DLL" 0101 0001 "11 60 C7" |
| 14 | 00 00 00 00 | 0000 0000 0000 0000 |

To interpret each section, the first eight bits (i.e., the Control Octet) are compared with table 3 above. This indicates node attributes and what information will follow. The Control Octet of section 1 indicates that it defines the Device ID where the monitored directory resides. In the present example, the Device ID is the "C" drive.

The example file map tree of the above table has twelve nodes that are represented by sections two through thirteen. For example, the Control Octet of section 2 indicates that this node has one child, no peers, and contains three characters in the name data (i.e., section 1 from the table 3). Following the Control Octet are the Name Octets, which translate into "C:\". The final octet is the Offset Octet, which indicates that the child of this node is located exactly five octets relative to the beginning of this node.

The remainder of the sections, except the fourteenth section, continue to describe the tree. Sections nine through twelve indicate dictionary lookups. Also, sections nine through thirteen are leaf nodes that must store the File ID. The fourteenth section was added to round the file map off to a double word boundary.

UNIX Implementation

Most UNIX operating systems support some derivative of the Berkeley Fast File System. In this file system, each file is identified internally by a simple data structure called an inode. Each inode is uniquely identified by a 32-bit integer that indicates the inode's position within the file system. This number is persistent and is used by directory entries to refer to the file.

Unlike Windows NT, UNIX file systems typically expose the directory lookup mechanism allowing the path lookup to be overridden. Because the path lookup also performs access checks, PerformanceSuite can override all directory access by overriding the lookup method and supporting a lookup by file identifier.

As is true in a Windows NT implementation, in a UNIX implementation of PerformanceSuite, user space applications need to be able to communicate with the UNIX device driver that provides the file system filtering. Where the operating system is a UNIX variant, the structures are slightly different from those on Windows NT, as communication is with the device driver only. This simplifies the design of the UNIX device driver because IOCTL requests destined to the file system do not need to be filtered.

The following paragraphs describe the PerformanceSuite IOCTL function codes and the structures associated with them for a UNIX implementation. Only the fields that differ from the NTFS implementation are described. Note that the _UNLOAD IO Control operation is not provided as on Windows NT, because on systems that support unloading of drivers, PerformanceSuite provides this through the native mechanism.

The PS_IOCTL_START operation causes change log monitoring to begin on the indicated volume. On successful completion, no map is installed. The filter does not redirect requests using the file identifier information, but simply monitors changes. In this way, it is ready for a use map control request to begin full operation. This operation accepts no input or output arguments. The request is targeted to a monitored volume. Zero (0) is returned on success. EINVAL is returned if the partition is not stopped.

The PS_IOCTL_STOP operation causes any current map to be unloaded and for change log maintenance on the volume to be halted. Because no map exists, filter redirection using map data does not occur. This accepts no input or output arguments. The result is one of 0 on success, or EINVAL if the volume is not currently started.

The PS_IOCTL_GET_CHANGES operation uses the following data structures.

```
typedef enum PS_Eventenum {Addpath, Deletepath, Renamepath}PS_EVENT_TYPE;
typedef struct _PS_FILE_IDENTIFIER {
    unsigned long      Generation;    // Consistency information for inode
    unsigned long      Inode;         // Unique identifier for this file
}PS_FILE_IDENTIFIER, *PPS_FILE_IDENTIFIER;
typedef struct _PS_CHANGE {
    unsigned long      Size;          // Size of this structure
    unsigned long      EventNumber;   // Unique identifier for this record
    PS_FILE_IDENTIFIER FileIdentifier; // Generation and inode numbers
    PS_EVENT_TYPE      EventType;     // AddPath, Deletepath or Renamepath
    unsigned short     Flags;         // PS_CHANGE_FLAG_xxx flags
    unsigned short     PathLength;    // Number of path characters
    unsigned short     RenameLength;  // Number of rename chars
    Unsigned char      Path[i];       // Actually:
                                      // Pathlength+RenameLength+1
```

```
}PS_CHANGE,*PPS_CHANGE;
#define PS_GET_CHANGE_BASE \
(sizeof(BOOLEAN)+sizeof(PS_CHANGE)+(4*sizeof(ULONG))
  typedef struct _PS_GET_CHANGE {
    unsigned long      Device;
    int                Wait;
    unsigned long      LowWaterMark;
    unsigned long      NumberOfChanges;
    unsigned long      NumberOfChangesRemaining;
    PS_CHANGE          Changes[1];
    Unsigned char      Padding[8192 - PS_GET_CHANGE_BASE];
}PS_GET_CHANGE, *PPS GET_CHANGE;
```

Because UNIX IOCTL requests support fixed size structures, the PS_CHANGE structure is fixed at 8192 bytes in size. Also, because the same buffer is used for input and output, the input fields of Wait and LowWaterMark are placed directly into the PS_GET_CHANGE function. The file identifier is a 32-bit generation number and a 32-bit inode number to support fast VFS lookups (see below). Because directing requests at the file system is impractical, the request also includes the device identifier (the field Device) for the volume to obtain changes for. The type of Path is an 8-bit clean single byte path.

An implementation of this is described in "Toward a Compatible Filesystem Interface", Michael J. Karels and Marshall Kirk McKusick, Computer Systems Research Group, Computer Science Division, Department of Electrical Engineering and Computer Science, University of California, Berkeley, Calif., 94720. The virtual file system (VFS) interface is documented as a file handle to vnode operation (or descendants thereof) where the inode and generation number make up the file handle which is used to obtain the vnode (the in-core data structure representing a file) for subsequent access. The described implementation details the vfs-fhtovp function providing this functionality. Most UNIX variants provide some derivation of this. For instance, the Sun Microsystems Solaris 2.6 operating system provides a nearly identical function called vfs_vget implemented by compatible file systems, VFS in particular.

The PS_IOCTL_USE_MAP operation uses the following data structures.

```
typedef struct _PS_USE_MAP {
  unsigned long Device;
  int devid; // device identifier
}PS_USE_MAP, *PPS_USE_MAP;
```

On Solaris, one of two special devices per volume will be memory-mapped into the Service address space and an updated map generated directly into this address space. In this way, a data copy is avoided. The format of the Map is unchanged, except that the device identifier is now the dev_t, which is a major/minor device number of the device the file system is mounted on. On UNIX, an inode and a device identifier uniquely refers to a file. Because directing requests at the file system is impractical, the request also includes the device identifier (the field Device) for the volume to obtain changes for.

The PS_IOCTL_COMMIT_CHANGES operation uses the following data structures.

```
typedef struct _PS_COMMIT_CHANGES {
  unsigned long Device;
  unsigned long EventNumber;
}PS_COMMIT_CHANGES, *PPS_COMMIT_CHANGES;
```

This is unchanged from Windows NT except for the Device field. Because directing requests at the file system is impractical, the request also includes the device identifier (the field Device) for the volume to obtain changes for.

The PS_IOCTL_GET_PARAMETERS operation uses the following data structure.

```
typedef struct _PS_PARAMETERS {
  unsigned long Device;
  unsigned long ChangeLogSizeInBytes;
  unsigned long MapValidationWaitPeriod; // Milliseconds
}PS_PARAMETERS, *PPS_PARAMETERS;
```

This differs from Windows NT in two ways. Because directing requests at the file system is impractical, the request also includes the device identifier (the field Device) for the volume to obtain changes for. Second, because no cache manipulation is performed on UNIX, the two parameters MaximumBytesPinned and DelayedCleanupProcessRate are not supported.

The PS_IOCTL_SET_PARAMETERS control option takes the same structure as the PS_IOCTL_GET_PARAMETERS, a PS_PARAMETERS structure, but as an input buffer with no output buffer being used. The parameters are defined above.

The invention has been described in terms of particular embodiments. Other embodiments are within the scope of the following claims. For example, the steps of the invention can be performed in a different order and still achieve desirable results.

What is claimed is:

1. A file system performance enhancement product operable to be executed on a computer running a regular file system, the product comprising:
   administration means for a user to select some files of the file system as monitored files, the remaining files of the file system being non-monitored files; and
   means for bypassing a lookup operation of the regular file system in favor of a lookup operation using lookup data maintained by the product;
   wherein operation of the regular file system is changed only with respect to monitored files;
   wherein a request to access a file is passively forwarded to the regular file system if the request is directed to a non-monitored file and the request is controlled by the product if the request is directed to a monitored file; and
   wherein the request to access a file is handled entirely by the regular file system if the request is directed to a monitored file and the product is not running on the computer.

2. A file system performance enhancement product operable to be executed on a computer running a regular file system, the product comprising:
   administration means for a user to select some files of the file system as monitored files, the remaining files of the file system being non-monitored files; and means for bypassing a lookup operation of the regular file system in favor of a lookup operation using lookup data maintained by the product;

wherein operation of the regular file system is changed only with respect to monitored files;

wherein a request to access a file is passively forwarded to the regular file system if the request is directed to a non-monitored file and the request is controlled by the product if the request is directed to a monitored file; and wherein the administration means is operable to allow the user to cause all file operation requests to be directed to the regular file system driver.

3. A file system performance enhancement product operable to be executed on a computer running a regular file system, the product comprising:

administration means for a user to select some files of the file system as monitored files, the remaining files of the file system being non-monitored files; and means for bypassing a lookup operation of the regular file system in favor of a lookup operation using lookup data maintained by the product;

wherein operation of the regular file system is changed only with respect to monitored files;

wherein a request to access a file is passively forwarded to the regular file system if the request is directed to a non-monitored file and the request is controlled by the product if the request is directed to a monitored file;

wherein the administration means is operable to create and maintain registry entries as necessary as the result of user interactions with the administration means; and wherein the administration means is operable to allow the user to set a toggle that returns a "file does not exist" response to requests for monitored files that cannot be found using the lookup data.

4. A file system performance enhancement product operable to be executed on a computer running a regular file system, the product comprising:

administration means for a user to select some files of the file system as monitored files, the remaining files of the file system being non-monitored files; and means for bypassing a lookup operation of the regular file system in favor of a lookup operation using lookup data maintained by the product;

wherein operation of the regular file system is changed only with respect to monitored files;

wherein a request to access a file is passively forwarded to the regular file system if the request is directed to a non-monitored file and the request is controlled by the product if the request is directed to a monitored file; and wherein all requests to monitored files that cannot be found using the lookup data are forwarded to be performed as regular file system operations.

5. A file system performance enhancement product operable to be executed on a computer running a regular file system, the product comprising:

administration means for a user to select some files of the file system as monitored files, the remaining files of the file system being non-monitored files;

means for bypassing a lookup operation of the regular file system in favor of a lookup operation using lookup data maintained by the product; and means for regenerating the lookup data whenever the computer is rebooted;

wherein operation of the regular file system is changed only with respect to monitored files; and wherein a request to access a file is passively forwarded to the regular file system if the request is directed to a non-monitored file and the request is controlled by the product if the request is directed to a monitored file.

6. A file system performance enhancement product operable to be executed on a computer running a regular file system, the product comprising:

administration means for a user to select some files of the file system as monitored files, the remaining files of the file system being non-monitored files;

means for bypassing a lookup operation of the regular file system in favor of a lookup operation using lookup data maintained by the product; and means for preventing the regular file system from updating an access time when monitored files are read through the product, the access time being an item of meta data otherwise maintained by the regular file system;

wherein operation of the regular file system is changed only with respect to monitored files; and wherein a request to access a file is passively forwarded to the regular file system if the request is directed to a non-monitored file and the request is controlled by the product if the request is directed to a monitored file.

7. A file system performance enhancement product operable to be executed on a computer running a regular file system, the product comprising:

administration means for a user to select some files of the file system as monitored files, the remaining files of the file system being non-monitored files; and means for bypassing a lookup operation of the regular file system in favor of a lookup operation using lookup data maintained by the product;

wherein operation of the regular file system is changed only with respect to monitored files; and wherein the means for bypassing a lookup operation uses an open-by-file-ID operation of the regular file system in place of an open-by-file-name operation of the regular file system.

8. A file system performance enhancement product operable to be executed on a computer running a regular file system, the product comprising:

administration means for a user to select some files of the file system as monitored files, the remaining files of the file system being non-monitored files; and means for bypassing a lookup operation of the regular file system in favor of a lookup operation using lookup data maintained by the product;

wherein operation of the regular file system is changed only with respect to monitored files; and wherein the means for bypassing a lookup operation uses a file-ID based vnode access operation of a UNIX virtual file system in place of a corresponding name based access operation.

9. A file system performance enhancement product operable to be executed on a computer running a regular file system, the product comprising:

administration means for a user to select some files of the file system as monitored files, the remaining files of the file system being non-monitored files; and means for bypassing a lookup operation of the regular file system in favor of a lookup operation using lookup data maintained by the product;

wherein operation of the regular file system is changed only with respect to monitored files; and wherein the lookup data comprises a high-performance index of monitored directories and files.

10. A file system performance enhancement product operable to be executed on a computer running a regular file system, the product comprising:
administration means for a user to select some files of the file system as monitored files, the remaining files of the file system being non-monitored files; and
means for bypassing a lookup operation of the regular file system in favor of a lookup operation using lookup data maintained by the product; and
means for obtaining meta data for monitored files and recording the meta data information for use by the product in bypassing operations of the regular file system;
wherein operation of the regular file system is changed only with respect to monitored files;
wherein the administration means includes means for the user to select a directory as a monitored directory, any files in the monitored directory, or any subdirectory contained within the monitored directory; and
wherein the product operates transparently in conjunction with the regular file system after an initial setup is completed.

11. The product of claim 10, further comprising means for maintaining in random access memory a distinct cache used only for meta data.

12. The product of claim 11, wherein the distinct cache used only for meta data is maintained in a compressed form using run-length encoding compression.

13. The product of claim 10, further comprising means for intercepting access requests made to the regular file system for monitored directories.

14. The product of claim 10, wherein the means for bypassing a lookup operation is operable to bypass directory-level security controls of the regular file system.

15. The product of claim 10, wherein
the regular file system maintains a cache of disk data in random access memory of the computer, the product further comprising means for controlling what data is maintained in the cache to discard data from a least recently used file; and
the administration means includes a computer program application running in user mode and interacting with the user through a graphical user interface.

16. The product of claim 15, wherein
the regular file system is a Windows NT version 4.0 or later file system (NTFS); and
the means for controlling what data is maintained in the cache comprises means for maintaining a memory-descriptor-list (MDL) read operation on a first monitored file until the first monitored file becomes the least-recently-used file, thereby affecting an NTFS primary file cache and pinning recently-used monitored files in the NTFS primary file cache.

17. The product of claim 16, wherein a read operation is handled without the intervention of the underlying file system by using the memory descriptor list information obtained from pinned data in cache memory as a result of a previously satisfied read operation.

18. A method for enhancing file system performance executed on a computer running a regular file system, the product comprising:
selecting one or more files of the file system as monitored files, the remaining files of the file system being non-monitored files;
maintaining lookup data for all monitored files in a separate enhanced file system;
bypassing a lookup operation of the regular file system in favor of a lookup operation using lookup data maintained by the separate enhanced file system;
passively forwarding a request to access a file to the regular file system if the request is directed to a non-monitored file and intercepting the request by the separate enhanced file system if the request is directed to a monitored file; and
handling the request to access a file entirely by the regular file system if the request is directed to a monitored file and the separate enhanced file system is not running on the computer;
wherein operation of the regular file system is changed only with respect to monitored files.

19. A method for enhancing file system performance executed on a computer running a regular file system, the product comprising:
selecting one or more files of the file system as monitored files, the remaining files of the file system being non-monitored files;
maintaining lookup data for all monitored files in a separate enhanced file system;
bypassing a lookup operation of the regular file system in favor of a lookup operation using lookup data maintained by the separate enhanced file system;
passively forwarding a request to access a file to the regular file system if the request is directed to a non-monitored file and intercepting the request by the separate enhanced file system if the request is directed to a monitored file; and
selectively configuring, based user input, the routing of all file operation requests to the regular file system driver;
wherein operation of the regular file system is changed only with respect to monitored files.

20. A method for enhancing file system performance executed on a computer running a regular file system, the product comprising:
selecting one or more files of the file system as monitored files, the remaining files of the file system being non-monitored files;
maintaining lookup data for all monitored files in a separate enhanced file system;
bypassing a lookup operation of the regular file system in favor of a lookup operation using lookup data maintained by the separate enhanced file system;
passively forwarding a request to access a file to the regular file system if the request is directed to a non-monitored file and intercepting the request by the separate enhanced file system if the request is directed to a monitored file;
creating and maintaining registry entries as necessary as the result of user interactions with the separate enhanced file system; and
selectively configuring the separate enhanced file system to allow the user to set a toggle that returns a "file does not exist" response to requests for monitored files that cannot be found using the lookup data;
wherein operation of the regular file system is changed only with respect to monitored files.

21. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system;

bypassing a lookup operation of the regular file system in favor of a lookup operation using lookup data maintained by the separate enhanced file system;

passively forwarding a request to access a file to the regular file system if the request is directed to a non-monitored file and intercepting the request by the separate enhanced file system if the request is directed to a monitored file; and forwarding all requests to monitored files that cannot be found using the lookup data to the regular file system for processing;

wherein operation of the regular file system is changed only with respect to monitored files.

22. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system;

bypassing a lookup operation of the regular file system in favor of a lookup operation using lookup data maintained by the separate enhanced file system;

passively forwarding a request to access a file to the regular file system if the request is directed to a non-monitored file and intercepting the request by the separate enhanced file system if the request is directed to a monitored file; and regenerating the lookup data whenever the computer is rebooted;

wherein operation of the regular file system is changed only with respect to monitored files.

23. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system;

bypassing a lookup operation of the regular file system in favor of a lookup operation using lookup data maintained by the separate enhanced file system;

passively forwarding a request to access a file to the regular file system if the request is directed to a non-monitored file and intercepting the request by the separate enhanced file system if the request is directed to a monitored file; and preventing the regular file system from updating an access time when monitored files are read through the separate enhanced file system, the access time being an item of meta data otherwise maintained by the regular file system;

wherein operation of the regular file system is changed only with respect to monitored files.

24. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system;

bypassing a lookup operation of the regular file system in favor of a lookup operation using lookup data maintained by the separate enhanced file system; and using an open-by-file-ID operation of the regular file system in place of an open-by-file-name operation of the regular file system when bypassing a lookup operation;

wherein operation of the regular file system is changed only with respect to monitored files.

25. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system;

bypassing a lookup operation of the regular file system in favor of a lookup operation using lookup data maintained by the separate enhanced file system; and using a file-ID based vnode access operation of a UNIX virtual file system in place of a corresponding name based access operation when bypassing a lookup operation;

wherein operation of the regular file system is changed only with respect to monitored files.

26. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system; and bypassing a lookup operation of the regular file system in favor of a lookup operation using lookup data maintained by the separate enhanced file system;

wherein operation of the regular file system is changed only with respect to monitored files; and wherein the lookup data comprises a high-performance index of monitored directories and files.

27. A method for enhancing file system performance executed on a computer running a regular file system, the product comprising:

selecting one or more files of the file system as monitored files, the remaining files of the file system being non-monitored files;

maintaining lookup data for all monitored files in a separate enhanced file system;

bypassing a lookup operation of the regular file system in favor of a lookup operation using lookup data maintained by the separate enhanced file system;

obtaining meta data for monitored files and recording the meta data information for use by the separate enhanced file system in bypassing operations of the regular file system, selecting by the user a directory as a monitored directory, any files in the monitored directory, or any subdirectory contained within the monitored directory; and operating transparently in conjunction with the regular file system after an initial setup is completed;

wherein operation of the regular file system is changed only with respect to monitored files.

28. The method of claim 27, further comprising maintaining in random access memory a distinct cache used only for meta data.

29. The method of claim 28, further comprising maintaining the distinct cache used only for meta data in a compressed form using run-length encoding compression.

30. The method of claim 27, further comprising intercepting access requests made to the regular file system for monitored directories.

31. The method of claim 27, further comprising bypassing directory-level security controls of the regular file system when bypassing a lookup operation.

32. The method of claim 27, further comprising maintaining by the regular file system a cache of disk data in random access memory of the computer, controlling by the separate enhanced file system what data is maintained in the cache to discard data from a least recently used file; and interacting with the user through a graphical user interface using a computer program application running in user mode on the computer.

33. The method of claim 32, wherein the regular file system is a Windows NT version 4.0 or later file system (NTFS), the method further comprising controlling what data is maintained in the cache including maintaining a memory-descriptor-list (MDL) read operation on a first monitored file until the first monitored file becomes the least-recently-used file, thereby affecting an NTFS primary file cache and pinning recently-used monitored files in the NTFS primary file cache.

34. The method of claim 33, further comprising handling a read operation without the intervention of the underlying file system by using the memory descriptor list information obtained from pinned data in cache memory as a result of a previously satisfied read operation.

35. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system; and bypass a lookup operation of the regular file system in favor of a lookup operation using lookup data maintained by the separate enhanced file system;

passively forward a request to access a file to the regular file system if the request is directed to a non-monitored file and intercept the request by the separate enhanced file system if the request is directed to a monitored file; and selectively configure, based user input, the routing of all file operation requests to the regular file system driver;

wherein operation of the regular file system is changed only with respect to monitored files.

36. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system;

passively forward a request to access a file to the regular file system if the request is directed to a non-monitored file and intercept the request by the separate enhanced file system if the request is directed to a monitored file;

create and maintain registry entries as necessary as the result of user interactions with the separate enhanced file system; and selectively configure the separate enhanced file system to allow the user to set a toggle that returns a "file does not exist" response to requests for monitored files that cannot be found using the lookup data;

wherein operation of the regular file system is changed only with respect to monitored files.

37. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system;

passively forward a request to access a file to the regular file system if the request is directed to a non-monitored file and intercept the request by the separate enhanced file system if the request is directed to a monitored file; and forward all requests to monitored files that cannot be found using the lookup data to the regular file system for processing;

wherein operation of the regular file system is changed only with respect to monitored files.

38. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system;

passively forward a request to access a file to the regular file system if the request is directed to a non-monitored file and intercept the request by the separate enhanced file system if the request is directed to a monitored file; and regenerate the lookup data whenever the computer is rebooted;

wherein operation of the regular file system is changed only with respect to monitored files.

39. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system;

passively forward a request to access a file to the regular file system if the request is directed to a non-monitored file and intercept the request by the separate enhanced file system if the request is directed to a monitored file; and prevent the regular file system from updating an access time when monitored files are read through the separate enhanced file system, the access time being an item of meta data otherwise maintained by the regular file system;

wherein operation of the regular file system is changed only with respect to monitored files.

40. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system; and use an open-by-file-ID operation of the regular file system in place of an open-by-file-name operation of the regular file system when bypassing a lookup operation;

wherein operation of the regular file system is changed only with respect to monitored files.

41. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system; and use a file-ID based vnode access operation of a UNIX virtual file system in place of a corresponding name based access operation when bypassing a lookup operation;

wherein operation of the regular file system is changed only with respect to monitored files.

42. A computer implemented method for enhancing file system performance executed on a computer running a regular file system, the method including instructions for causing a computer to:

select one or more files of the file system as monitored files, the remaining files of the file system being non-monitored files;

maintain lookup data for all monitored files in a separate enhanced file system;

bypass a lookup operation of the regular file system in favor of a lookup operation using lookup data maintained by the separate enhanced file system;

obtain meta data for monitored files and recording the meta data information for use by the separate enhanced file system in bypassing operations of the regular file system;

select by the user a directory as a monitored directory, any files in the monitored directory, or any subdirectory contained within the monitored directory; and operate transparently in conjunction with the regular file system after an initial setup is completed;

wherein operation of the regular file system is changed only with respect to monitored files.

43. The method of claim 42, further comprising instructions to maintain in random access memory a distinct cache used only for meta data.

44. The method of claim 42, further comprising instructions to bypass directory-level security controls of the regular file system when bypassing a lookup operation.

45. The method of claim 42, further comprising instructions to maintain by the regular file system a cache of disk data in random access memory of the computer, control by the separate enhanced file system what data is maintained in the cache to discard data from a least recently used file; and interact with the user through a graphical user interface using a computer program application running in user mode on the computer.

46. The method of claim 32, wherein the regular file system is a Windows NT version 4.0 or later file system (NTFS), the method further comprising instructions to control what data is maintained in the cache including maintaining a memory-descriptor-list (MDL) read operation on a first monitored file until the first monitored file becomes the least-recently-used file, thereby affecting an NTFS primary file cache and pinning recently-used monitored files in the NTFS primary file cache.

47. The method of claim 46, further comprising instructions to handle a read operation without the intervention of the underlying file system by using the memory descriptor list information obtained from pinned data in cache memory as a result of a previously satisfied read operation.

* * * * *